United States Patent
Shekel et al.

(10) Patent No.: US 6,813,023 B2
(45) Date of Patent: Nov. 2, 2004

(54) AUTOMATIC OPTICAL INTER-ALIGNMENT OF TWO LINEAR ARRANGEMENTS

(75) Inventors: Eyal Shekel, Jerusalem (IL); Guy Matmon, Jerusalem (IL); Eli Rephaeli, Neve Daniel (IL)

(73) Assignee: Chiaro Nerwork Ltd., Jerusalem (IL)

( * ) Notice: Subject to any disclaimer, the term of this patent is extended or adjusted under 35 U.S.C. 154(b) by 174 days.

(21) Appl. No.: 10/037,925

(22) Filed: Jan. 3, 2002

(65) Prior Publication Data

US 2003/0123061 A1 Jul. 3, 2003

(51) Int. Cl.[7] .............................................. G01B 11/00
(52) U.S. Cl. ..................................................... 356/400
(58) Field of Search ................................. 356/399–401, 356/73.1, 153, 154; 385/14, 15, 52, 12, 13, 24; 398/10, 16, 17, 156; 250/559.29, 559.3, 559.37, 227.3, 559.33; 700/279; 702/94, 150

(56) References Cited

U.S. PATENT DOCUMENTS

| | | | |
|---|---|---|---|
| 5,037,181 A | | 8/1991 | Byer et al. .................. 385/144 |
| 5,138,676 A | | 8/1992 | Stowe et al. ................. 385/32 |
| 5,177,348 A | * | 1/1993 | Laor ........................ 250/201.1 |
| 5,195,154 A | | 3/1993 | Uchida ........................ 385/88 |
| 5,210,800 A | | 5/1993 | Asai et al. ..................... 385/12 |
| 5,261,156 A | * | 11/1993 | Mase et al. ..................... 29/832 |
| 5,377,286 A | * | 12/1994 | Iida et al. ...................... 385/33 |
| 5,394,498 A | * | 2/1995 | Hinterlong et al. ......... 385/115 |
| 5,446,815 A | * | 8/1995 | Ota et al. ....................... 385/33 |
| 5,452,393 A | | 9/1995 | Stowe et al. ................. 385/123 |
| 5,458,538 A | | 10/1995 | Bowen et al. ................. 385/92 |
| 5,482,585 A | | 1/1996 | Ota et al. ..................... 156/158 |
| 5,487,124 A | | 1/1996 | Bowen et al. ................. 385/93 |
| 5,559,915 A | | 9/1996 | Deveau ........................ 385/49 |
| 5,570,442 A | | 10/1996 | Arii et al. ..................... 385/46 |
| 5,579,424 A | | 11/1996 | Schneider ..................... 385/49 |
| 5,600,741 A | | 2/1997 | Hauer et al. .................. 385/35 |
| 5,600,745 A | | 2/1997 | Wuu et al. .................... 385/49 |
| 5,611,014 A | | 3/1997 | Basavanhally ............... 385/90 |
| 5,625,726 A | | 4/1997 | Ichigi ........................... 385/14 |
| 5,656,120 A | | 8/1997 | Ota et al. .................... 156/293 |
| 5,677,973 A | * | 10/1997 | Yuhara et al. ................ 385/90 |
| 5,703,973 A | | 12/1997 | Mettler et al. ................ 385/14 |
| 5,703,980 A | | 12/1997 | MacElwee et al. .......... 385/49 |
| 5,706,378 A | | 1/1998 | Suzuki et al. ................. 385/49 |
| 5,708,741 A | | 1/1998 | DeVeau ........................ 385/49 |
| 5,712,937 A | | 1/1998 | Asawa et al. ................. 385/49 |
| 5,712,940 A | | 1/1998 | Van Roemburg et al. .... 385/93 |
| 5,721,797 A | | 2/1998 | Basavanhally et al. ....... 385/49 |
| 5,732,173 A | | 3/1998 | Bylander et al. ............. 385/49 |
| 5,732,181 A | | 3/1998 | Engberg et al. ............. 385/139 |
| 5,737,138 A | | 4/1998 | Someno ....................... 359/900 |
| 5,745,265 A | | 4/1998 | Hasegawa et al. ............ 359/15 |
| 5,761,178 A | | 6/1998 | Fukakusa et al. ........... 369/112 |
| 5,784,509 A | | 7/1998 | Yamane et al. ............... 385/49 |
| 5,793,914 A | | 8/1998 | Sasaki ........................ 385/49 |
| 5,828,800 A | | 10/1998 | Henry et al. .................. 385/20 |
| 5,835,659 A | | 11/1998 | Ota et al. .................... 385/137 |
| 5,852,700 A | * | 12/1998 | Caponi et al. .............. 385/123 |

(List continued on next page.)

Primary Examiner—Zandra V. Smith
Assistant Examiner—Gordon J. Stock, Jr.
(74) Attorney, Agent, or Firm—Ladas & Parry

(57) ABSTRACT

A technique for dynamic optical alignment precisely adjusts the relative position of a first linear arrangement with respect to a second linear arrangement by correcting rotational misalignment about the vertical axis, establishing an optimal displacement therebetween along an optical axis, correcting rotational misalignment about the optical axis, and setting an optimum displacement therebetween on the vertical axis. The technique is carried out semiautomatically using a computer to operate actuators to control movement of the first linear arrangement, while the second linear arrangement is fixedly disposed on a substrate. When optimal alignment has been established, the first linear arrangement is fixedly attached to the substrate.

4 Claims, 15 Drawing Sheets

U.S. PATENT DOCUMENTS

| | | | |
|---|---|---|---|
| 5,854,867 A | 12/1998 | Lee et al. | 385/49 |
| 5,854,868 A | 12/1998 | Yoshimura et al. | 385/50 |
| 5,859,945 A | 1/1999 | Kato et al. | 385/89 |
| 5,867,619 A | 2/1999 | Jarek et al. | 385/52 |
| 5,872,880 A * | 2/1999 | Maynard | 385/88 |
| 5,875,274 A | 2/1999 | Stein | 385/49 |
| 5,881,190 A | 3/1999 | Harpin et al. | 385/49 |
| 5,892,857 A | 4/1999 | McCallion | 385/1 |
| 5,898,806 A | 4/1999 | Nishimoto | 385/49 |
| 5,907,649 A | 5/1999 | Acklin et al. | 385/49 |
| 5,926,594 A * | 7/1999 | Song et al. | 385/49 |
| 5,986,451 A | 11/1999 | Kagan | 324/210 |
| 6,074,104 A * | 6/2000 | Higashikawa | 385/94 |
| 6,081,499 A | 6/2000 | Berger et al. | 369/112 |
| 6,157,012 A * | 12/2000 | Tanaka et al. | 219/633 |
| 6,175,675 B1 * | 1/2001 | Lee et al. | 385/50 |
| 6,226,424 B1 | 5/2001 | Ball et al. | 385/14 |
| 6,249,625 B1 | 6/2001 | Pan | 385/43 |
| 6,366,720 B1 | 4/2002 | Shekel et al. | 385/33 |
| 6,370,302 B2 | 4/2002 | Shekel et al. | 385/52 |
| 6,442,451 B1 * | 8/2002 | Lapham | 700/245 |
| 6,480,651 B1 * | 11/2002 | Rabinski | 385/52 |
| 6,556,285 B1 * | 4/2003 | Dickson | 356/121 |
| 6,587,611 B1 * | 7/2003 | Hunt | 385/18 |
| 6,589,376 B1 * | 7/2003 | Davis et al. | 156/64 |
| 6,590,658 B2 * | 7/2003 | Case et al. | 356/401 |
| 6,654,523 B1 * | 11/2003 | Cole | 385/52 |
| 6,654,524 B2 * | 11/2003 | Shekel et al. | 385/52 |
| 2003/0053054 A1 * | 3/2003 | Li et al. | 356/399 |
| 2003/0063277 A1 * | 4/2003 | Kennedy et al. | 356/400 |

* cited by examiner

AUTOMATIC OPTICAL INTER-ALIGNMENT OF TWO LINEAR ARRANGEMENTS

BACKGROUND OF THE INVENTION

1. Field of the Invention

This invention relates to alignment of optical devices. More particularly this invention relates to apparatus and method for the automatic optical alignment of two linear structures.

2. Description of the Related Art

In the past, the assembly and manufacture of optical assemblies having a linear array of optical elements has been time consuming and prone to quality control problems. The latest developments in optical cross-connect assemblies have only magnified these problems. Precisely engineered optical receiver arrays are required in these assemblies. A general demand for more precisely constructed assemblies having greater reliability has translated into a demand for better manufacturing apparatus and processes.

Optical devices of the type addressed by the present invention currently in use involve an array of optical fibers having light transmitted therethrough. The light exiting the end faces of the fibers is transmitted through a plurality of waveguides, which produce a diffraction pattern. The diffracted light is collimated by focusing optics, and then falls on a detector array.

In order to equalize the signals falling on individual elements of the detector array, it is necessary that the detector array be precisely aligned with respect to the axis of the waveguides and the focusing optics. Optimizing the alignment has heretofore been a tedious, labor intensive process. In some applications the detector array is positioned manually, and adjustment of the input elements is performed using a manual technique. This is because the cross section of the detectors is large enough to permit manual manipulation.

SUMMARY OF THE INVENTION

It is therefore a primary object of some aspects of the present invention to improve the manufacture of optical linear arrangements.

It is another object of some aspects of the present invention to automate the alignment of two linear optical arrangements relative to one another with a high degree of precision.

There is thus provided in accordance with a preferred embodiment of the invention a method of alignment, which includes the steps of:

holding a first optical element in opposition to a second optical element for interalignment therewith, the second optical element including a plurality of receivers including a first marginal receiver and a second marginal receiver, the first optical element having a first axis and a second axis, and the second optical element having a third axis and a fourth axis, detecting a plurality of light signals that pass from the first optical element to the second optical element, the light signals including a first light signal that impinges on the first marginal receiver, and a second light signal that impinges on the second marginal receiver, in a first phase of operation the first optical element is rotated about a Y-axis until the second axis is in a parallel alignment with the fourth axis and in a second phase of operation the first optical element is displaced along the Y-axis and while displacing the first optical element along the Y-axis, recording a signal strength of one of the first light signal and the second light signal and displacing the first optical element along a Z-axis until the signal strength has an optimal value.

There is also provided in accordance with a preferred embodiment of the present invention a computer software product, which includes a computer-readable medium in which program instructions are stored and the program instructions are read by a computer, wherein the computer is connected to an alignment apparatus. The alignment apparatus includes a chuck holding a first optical element thereon, the first optical element opposing a second optical element for interalignment therewith, the second optical element includes a plurality of receivers, which includes a first marginal receiver and a second marginal receiver, the first optical element having a first axis and a second axis, the second optical element having a third axis and a fourth axis, a plurality of detectors, each of the detectors detecting light emitted from the first optical element that impinges on one of the receivers, the detectors include a first detector that detects the light impinging on the first marginal receiver, and a second detector that detects the light impinging on the second marginal receiver, a first actuator for displacing the chuck on a Y-axis, the first actuator being driven by a first motor, a second actuator for displacing the chuck on a Z-axis, the second actuator being driven by a second motor, a third actuator for rotating the chuck about the Y-axis, the third actuator being driven by a third motor, wherein the computer receives a plurality of signals from the detectors, the signals including a first signal from the first detector, a second signal from the second detector, the computer transmitting control signals to energize the first motor, the second motor, and the third motor and the instructions, when read by the computer, causes the computer to perform the steps of: in a first phase of operation, energizing the third motor to rotate the chuck about the Y-axis until the second axis is in a parallel alignment with the fourth axis and in a second phase of operation energizing the first motor to displace the chuck along the Y-axis, while performing the step of energizing the first motor, recording a response of one of the first detector, the second detector and energizing the second motor to displace the chuck along the Z-axis until a first function of the response has an optimal value.

There is further provided in accordance with a preferred embodiment of the present invention an alignment apparatus, which includes a chuck holding a first optical element thereon, the first optical element opposing a second optical element for interalignment therewith, the second optical element including a plurality of receivers including a first marginal receiver and a second marginal receiver, the first optical element having a first axis, the second optical element having a second axis, a plurality of detectors, each of the detectors detecting light emitted from the first optical element that impinges on one of the receivers, the detectors include a first detector that detects the light impinging on the first marginal receiver, and a second detector that detects the light impinging on the second marginal receiver, a first actuator for displacing the chuck on a Y-axis, the first actuator being driven by a first motor, a second actuator for displacing the chuck on a Z-axis, the second actuator being driven by a second motor, a third actuator for rotating the chuck about the Y-axis, the third actuator being driven by a third motor, a computer, receiving a plurality of signals from the detectors, the signals including a first signal from the first detector, a second signal from the second detector, the computer transmitting control signals to energize the first motor, the second motor, and the third motor, computer program instructions being stored in the computer, which instructions. When the instructions are read by the computer, the computer performs the steps of: in a first phase of operation energizing the third motor to rotate the chuck about the Y-axis until the first axis is in a parallel alignment with the second axis and in a second phase of operation energizing the first motor to displace the chuck along the Y-axis. While performing the step of energizing the first motor, recording a response of one of the first detector, the second detector and energizing the second motor to displace the chuck along the Z-axis until a first function of the response has an optimal value.

There is further provided in accordance with yet another preferred embodiment of the present invention an alignment apparatus, which includes a chuck holding a first optical element thereon, the first optical element opposing a second optical element for interalignment therewith, the second optical element being carried on a substrate, the second optical element including a plurality of receivers including a first marginal receiver and a second marginal receiver, the first optical element having a first axis and a second axis, the second optical element having a third axis and a fourth axis, a first actuator for displacing the chuck on a Y-axis, the first actuator being driven by a first motor, a second actuator for displacing the chuck on a Z-axis, the second actuator being driven by a second motor, a third actuator for rotating the chuck about the Y-axis, the third actuator being driven by a third motor, a fourth actuator for rotating the chuck about the Z-axis, the fourth actuator being driven by a fourth motor, a third optical element, directing a beam along the Z-axis in a light path that extends between a light source and the second optical element via the first optical element, a plurality of detectors, each of the detectors detecting the beam impinging on one of the receivers, the detectors including a first detector that detects the beam impinging on the first marginal receiver, and a second detector that detects the beam impinging on the second marginal receiver, a computer, receiving a plurality of signals from the detectors, the signals including a first signal from the first detector, a second signal from the second detector, the computer transmitting control signals to energize the first motor, the second motor, the third motor, and the fourth motor, computer program instructions being stored in the computer, which instructions, when read by the computer. The computer performs the steps of: in a first phase of operation energizing the third motor to rotate the chuck about the Y-axis until the second axis is in parallel alignment with the fourth axis, in a second phase of operation energizing the first motor to displace the chuck along the Y-axis, while performing the step of energizing the first motor, recording a response of one of the first detector, the second detector and energizing the second motor to displace the chuck along the Z-axis until a first function of the response has an optimal value and in a third phase of operation energizing the fourth motor to rotate the chuck about the Z-axis until the first signal and the second signal are equalized.

Further in accordance with a preferred embodiment of the present invention the first axis and the third axis are substantially parallel and second and the fourth axis are substantially parallel.

Still further in accordance with a preferred embodiment of the present invention the first axis and the second axis are substantially orthogonal and the third axis and the fourth axis are substantially orthogonal.

Further in accordance with a preferred embodiment of the present invention the step of recording the signal strength further includes the step of determining a full-width half maximum (FWHM) of the signal strength.

Additionally in accordance with a preferred embodiment of the present invention the step of recording the signal strength further includes determining a full-width half maximum squared of the signal strength, wherein the optimal value is a minimum value of the full-width half maximum squared.

Further in accordance with a preferred embodiment of the present invention the method also includes the steps of:
  displacing the first optical element stepwise on an interval of the Z-axis, defining a plurality of incremental positions thereon, in the first phase of operation, such that at each of the incremental positions displacing the first optical element on an interval of the Y-axis,
  while displacing the first optical element on the interval of the Y-axis is being performed, determining a function of the first light signal and determining the function of the second light signal,
  after the step of displacing the first optical element stepwise on the interval of the Z-axis has been performed, determining a first point on the Z-axis where the function of the first light signal has a first optimum value and a second point on the Z-axis where the function of the second light signal has a second optimum value, calculating a difference $\Delta Z$ between the second point and the first point, responsive to the step of calculating rotating the first optical element about the Y-axis to reduce a distance between the first marginal receiver and the second point.

Preferably, the step of rotating the first optical element about the Y-axis includes rotation by an angle $\theta$ that is given by $$\theta = \sin^{-1}(\Delta Z/d)$$

where d is a displacement between the first marginal receiver and the second marginal receiver.

Further in accordance with a preferred embodiment of the present invention the function is a full-width half maximum, the first optimum value and the second optimum value are each a minimum value of the function.

Additionally in accordance with a preferred embodiment of the present invention the method further includes the steps of, in the second phase of operation:
  in a first iteration displacing the first optical element on an interval of the Y-axis,
  while the step of displacing the first optical element is being performed in the first iteration, determining a function of at least one of the light signals to define a first determination of the function,
  displacing the first optical element on the Z-axis by a first increment;
  in a second iteration, displacing the first optical element on the interval of the Y-axis;
  while the step of displacing the first optical element is being performed in the second iteration, determining the function to define a second determination of the function; and responsive to a difference between the first determination and the second determination, displacing the first optical element on the Z-axis by a second increment.

Further in accordance with a preferred embodiment of the present invention the function is a full-width half maximum squared.

Still further in accordance with a preferred embodiment of the present invention the step of determining the function includes determining a sum of the function of a first one of the light signals and the function of a second one of the light signals.

Further in accordance with a preferred embodiment of the present invention the method also includes the steps of:

in a first iteration: displacing the first optical element on an interval of the Y-axis, while the step of displacing the first optical element is being performed in the first iteration, determining a first point on the Y-axis wherein a first signal has a first maximum magnitude, and determining a first magnitude of a second signal at the first point, rotating the first optical element about the Z-axis by a first increment, in a second iteration: displacing the first optical element on the interval of the Y-axis, while the step of displacing the first optical element is being performed in the second iteration, determining a second point on the Y-axis wherein the first light signal has a second maximum magnitude, and determining a second magnitude of the second light signal at the second point, responsive to a difference between the first magnitude and the second magnitude, rotating the first optical element about the Z-axis by a second increment.

Further in accordance with a preferred embodiment of the present invention the computer software product the first function includes a function of a full-width half maximum of a plot of the response.

Preferably, the first function is a full-width half maximum squared, and the optimal value is a minimum value.

Additionally in accordance with a preferred embodiment of the present invention the second function is a full-width half maximum, the first optimum value and the second optimum value are each a minimum value of the second function.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well-known circuits, control logic, and the details of computer program instructions for conventional algorithms and processes have not been shown in detail in order not to obscure the present invention unnecessarily.

Software programming code, which embodies aspects of the present invention, is typically stored in permanent storage of some type, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The term "optical" used throughout the present specification and claims includes electromagnetic radiation in the UV, visible and IR spectral wavebands. The term "light" used throughout the present specification and claims includes electromagnetic radiation in the UV, visible and IR spectral wavebands.

Overview.

The disclosure herein is organized into three sections: (1) a disclosure of physical elements of an alignment apparatus; (2) an explanation of a graphical computer program that monitors and controls the alignment apparatus; and (3) a disclosure of the operating procedures of the apparatus, using the computer program to achieve an alignment of optical components of an optical assembly.

Alignment Apparatus.

Figure 1:
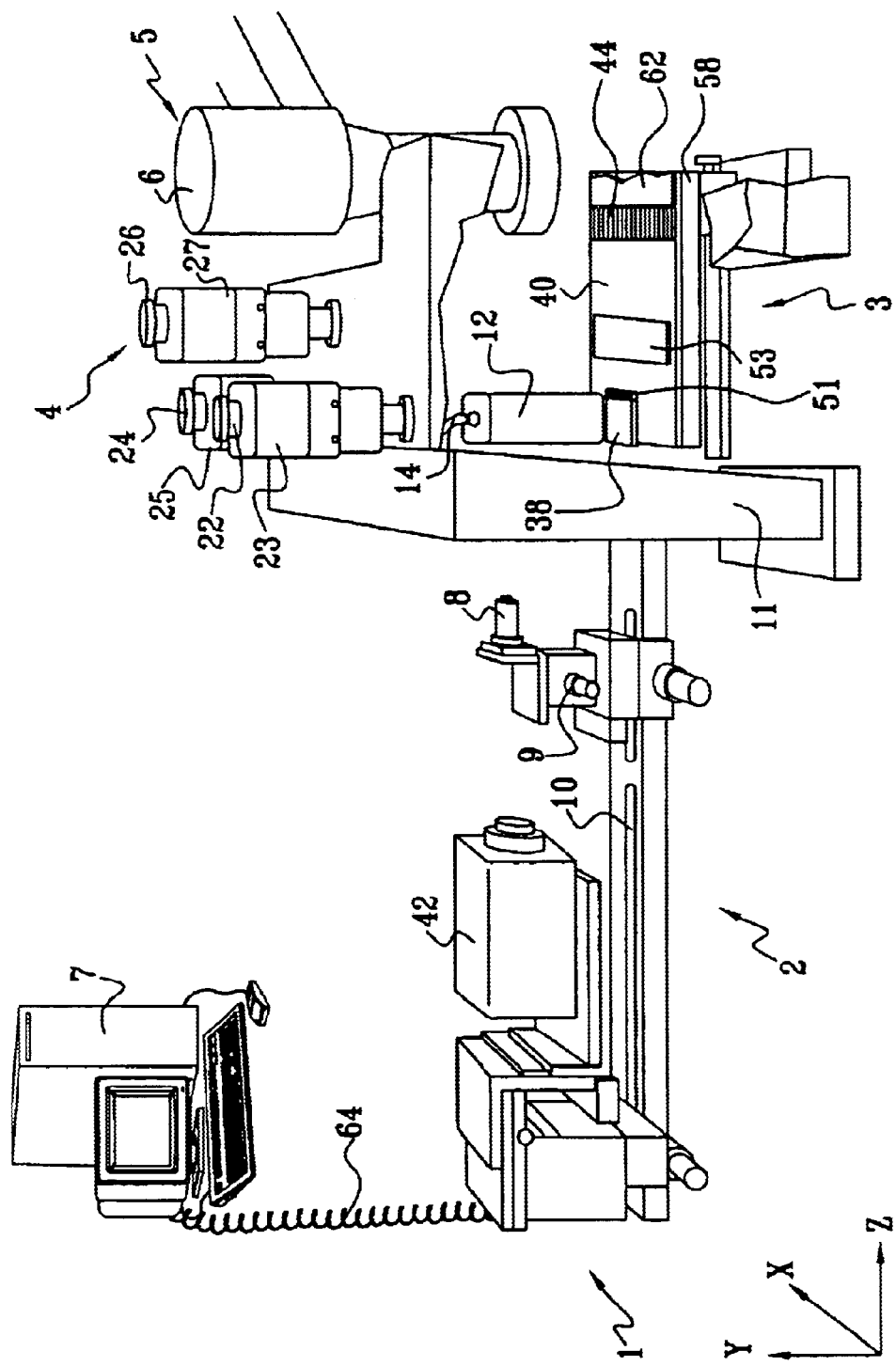
FIG. 1 is an elevation of an assembly workstation, which is constructed and operative in accordance with a preferred embodiment of the present invention.

Turning now to the drawings, reference is made to FIG. 1, which shows an assembly station 1 that is constructed and operative in accordance with a preferred embodiment of the invention. In describing the assembly station 1, the following conventions are used. The Z-axis is nominally horizontal, and coincides with the optical axis of an optical element that is being held and manipulated. The X-axis refers to the horizontal axis that is orthogonal to the Z-axis. The Y-axis is the vertical axis, and is orthogonal to both the X-axis and the Z-axis. Rotation about the X-axis, Y-axis, and Z-axis is referred to as θX, θY and θZ motion or rotation respectively. Of course it is possible to operate the apparatus disclosed herein in many positions and orientations, in which case the X-axis, Y-axis, and Z-axis are appropriately translated.

The assembly station 1 has an input section 2, a manipulator subassembly 3, and a stage subassembly 4. The input section 2 has the general function of directing an aligned beam of light into the manipulator subassembly 3. An optical assembly under construction is mounted on the stage subassembly 4. In operation the stage subassembly 4 carries an optical assembly under construction (not shown), including certain optical components which are to be aligned, as described hereinbelow with reference to FIG. 2. A viewing section 5 allows an operator to view the working stage subassembly 4, and evaluate the operation of the assembly station 1 visually, using a stereo microscope 6.

Further details of the input section 2 are now disclosed. A general purpose computer 7 is provided to control movements occurring within the manipulator subassembly 3. These movements will be disclosed in further detail hereinbelow. An input lens 8 is mounted on a stage 9. The stage 9 is capable of motion along the X-axis, Y-axis, and is also capable of θX and θY motion. The lens 8 also moves along a guide-rail 10, which is aligned in the Z-axis.

Figure 2:
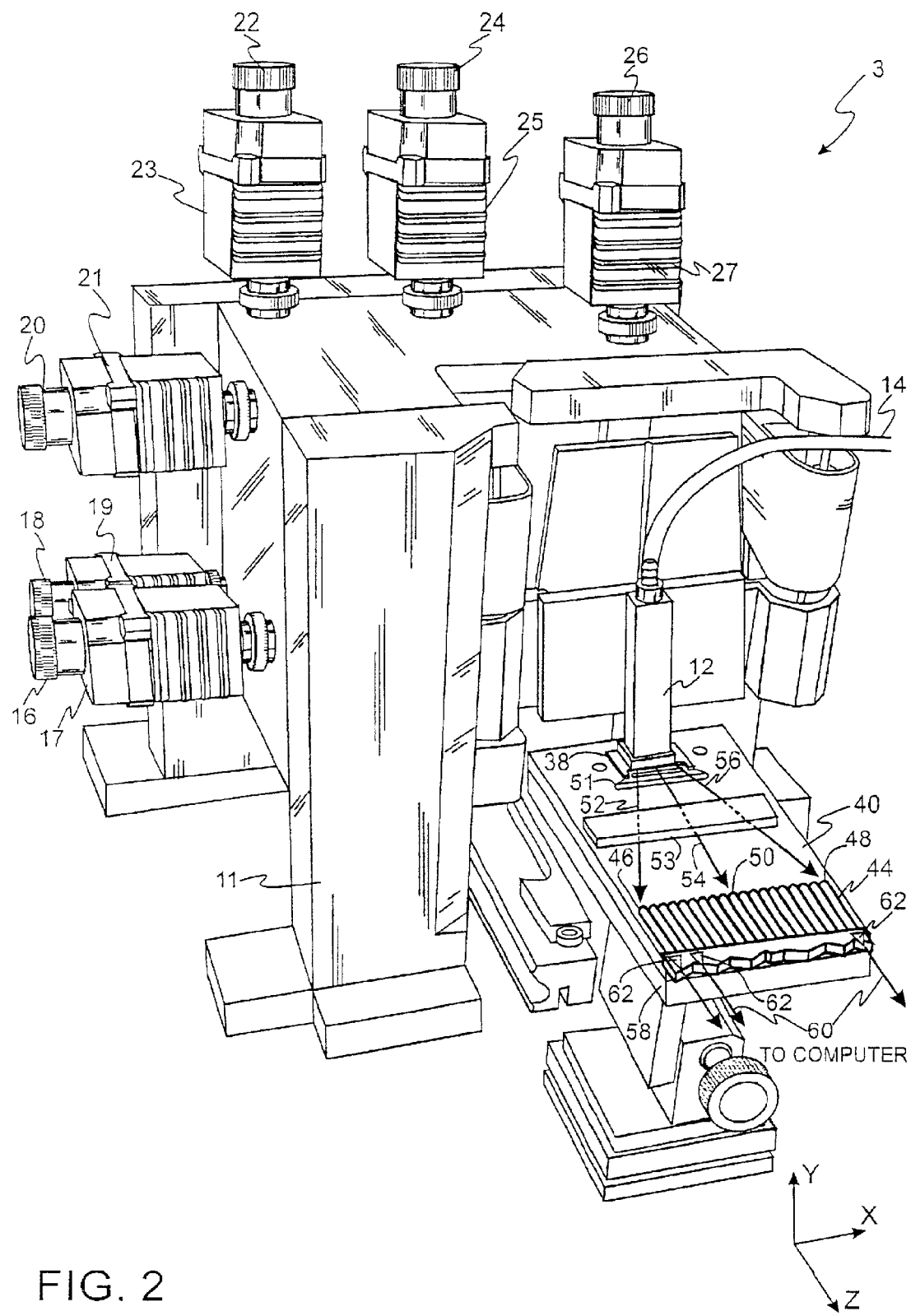
FIG. 2 is a partially schematic perspective view of a section of a manipulator portion of the assembly workstation shown in FIG. 1, having an optical assembly in position for alignment thereon in accordance with a preferred embodiment of the present invention.

Reference is now made to FIG. 2, which illustrates the manipulator subassembly 3 in further detail. The description of FIG. 2 is to be read in conjunction with FIG. 1. A frame 11 carries a vacuum-held chuck 12, which is connected to a vacuum line 14. The chuck 12 is linked to actuators 16, 18, 20, which respectively provide the chuck 12 with motion along the X-axis, Y-axis, and Z-axis. Actuators 22, 24, 26 respectively enable θX, θY and θZ motion of the chuck 12. Both the actuator 16 and the actuator 18 are equipped with a piezocontroller (not shown). The X-axis and Y-axis piezocontrollers are provided in order to control movement in their respective axes, with extreme accuracy. The actuators 16, 18, 20, 22, 24, 26 are respectively operated by motors 17, 19, 21, 23, 25, 27. The chuck 12 can move independently of the stage 9 (FIG. 1).

Figure 3:
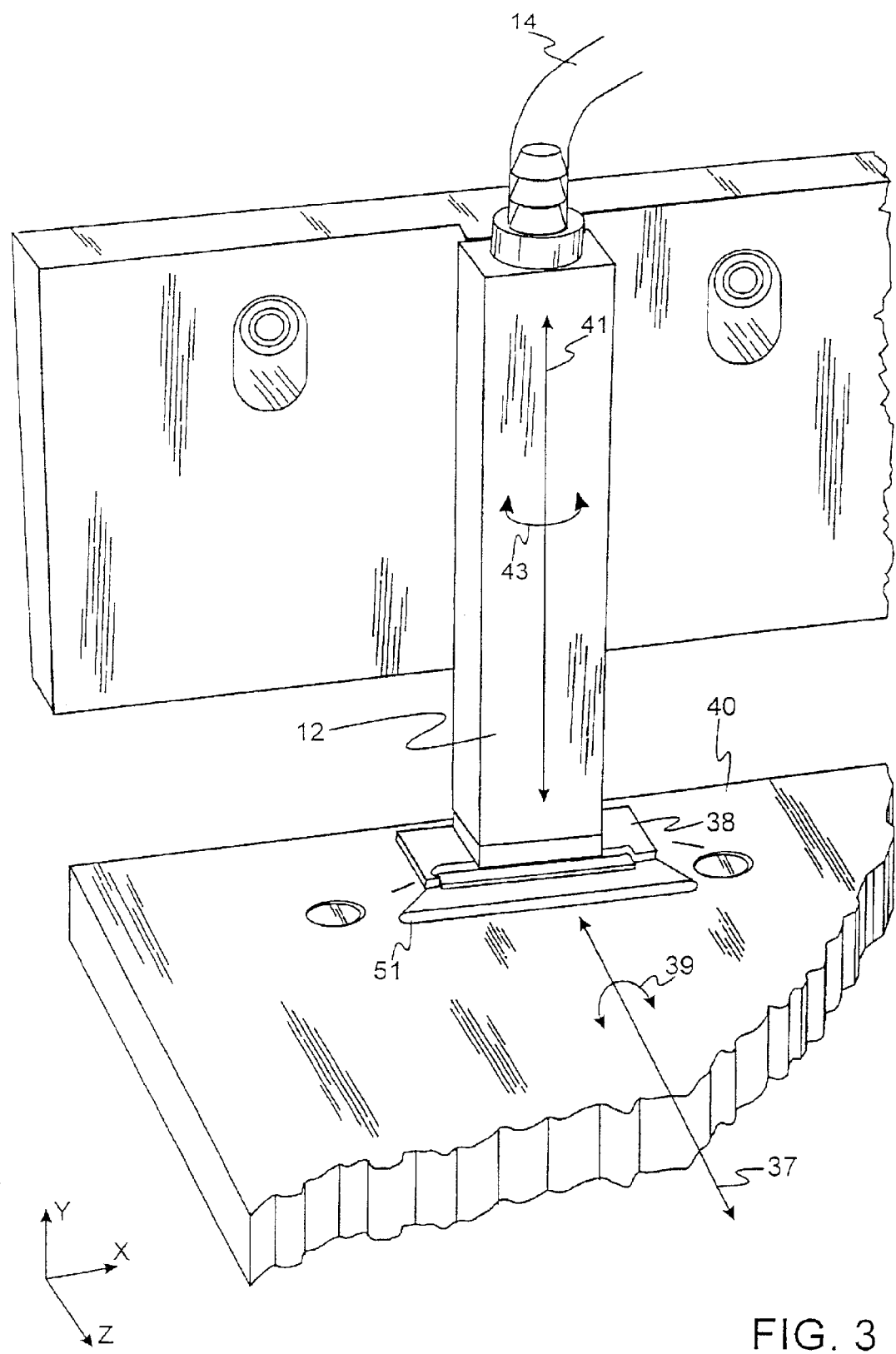
FIG. 3 is an enlarged view of a portion of the manipulator portion shown in FIG. 2, indicating rotations and linear motions about the XY-plane and the XZ-plane, in accordance with a preferred embodiment of the present invention.

Reference is now made FIG. 3, which illustrates portions of the manipulator subassembly 3 and the stage subassembly 4 in further detail. The description of FIG. 3 is to be read in conjunction with FIG. 1 and FIG. 2. An optical element 38 is secured to the lower end of the chuck 12 in proximity to a substrate 40. The optical element 38 and the substrate 40 comprise portions of an optical assembly being manufactured. The optical element 38 is typically a linear arrangement of optical devices or sub-elements, such as an array of emitters, a cylindrical lens, or an array of lenses, for example cylindrical lenses. The chuck 12 is aligned with the lens 8 in the Z-axis so that a beam is transmitted via the lens 8 through the optical element 38. Motions of the chuck 12 relative to the substrate 40 are indicated by arrows in order to facilitate understanding of the operation of the assembly station 1. Motion of the chuck 12 along the Z-axis is shown by a double-pointed arrow 37. θZ motion is indicated by an arrow 39. Motion of the chuck 12 along the Y-axis is shown by a double-pointed arrow 41. θY motion is indicated by an arrow 43.

Reference is again made to FIG. 2. The optical element 38 is located opposite an array 44 of optical receivers, such as waveguides or lenses, which include corresponding off-center marginal receivers 46, 48, and a central receiver 50. The substrate 40 and the array 44 are carried on a stage 58. The beam directed through the optical element 38 impinges on the array 44. It is an object of the assembly station 1 to align the array 44 with respect to the optical element 38 such that the optical radiation received at each of the corresponding off-center elements of the array 44, for example the marginal receiver 46 and the marginal receiver 48, are equal. During the alignment procedure the substrate 40 and the array 44 are carried on a stage 58.

A radiation detector 62 is located at the output end of each of the receiving elements of the array 44 and connected to the computer 7 by an individual communication channel 60. In some embodiments the optical receivers of the array 44 may be the detectors themselves. The radiation from the emitters or lenses in the optical element 38 is directed to the receivers of the array 44, ant is detected by the detectors 62. Signals produced in the detectors 62, which are responsive to the intensity of the detected light, are transmitted to the computer 7. Light from the emitters or lenses of the optical element 38 can also be detected by camera lenses (not shown) for documenting the alignment process or to aid a human observer.

In the presently preferred embodiment, the beams of radiation emitted by the sub-elements of element 38 impinge on the elements of the array 44. FIG. 2 shows typical radiation beams 52, and 56, impinging on the off-center receiving elements 46 and 48 of the array 44, respectively, and a beam 54 impinging on the central receiver 50 of the array 44. The beam 54 originates from a central element of the optical element 38 and is directed along the principal optical axis of the array 44, to the central receiver 50. The beams 52, 56 originate from individual elements of the optical element 38, and are each specifically directed to one of the off-center marginal receivers 46, 48. In the schematic portion of FIG. 2, the divergence of the beams 52, 56 and the dimensions of the optical element 38 and the array 44 have been exaggerated for clarity of presentation. A rod lens 51 focuses the beams in the vertical axis. The beams then pass through an array of rib waveguides 53. Upon reaching the array 44, each of the beams 52, 54, 56 has a relatively wide spread (400 μm) along the X-axis, and is focused by the corresponding element of the array 44 into a narrow line image, measuring 2 μm on the Y-axis. Currently the pitch of the line images in the X-axis, that is, the distance between the center of a line image and the center of its immediate neighbor, is 750 μm. It is required to achieve alignment with minimal variation from an optimum position. Current tolerances are 5 μm in the X-axis, 0.1 μm in the Y-axis, and 1 μm in the Z-axis.

Alignment Procedure Overview.

Reference is again made to FIG. 3. The approach of the alignment procedure is to locate the array 44 on the substrate 40, relative to the element 38, so that each of the detectors 62 receives the maximum optical radiation transmitted by the optical element 38.

The array 44 (FIG. 2) is fixed to the substrate 40, by any suitable means and the chuck 12, to which is attached the element 38, is moved in the XZ plane, the XY plane, rotated about the XZ plane (θZ movement), and rotated about the XY plane (θY movement) typically in iterative procedures.

It will be appreciated that due to possible angular misalignment about the Z-axis, as the chuck 12 and the optical element 38 change their Y-position, different detectors of the array 44 may receive radiation from elements of the optical element 38 at different Y-positions of the chuck 12.

It will be further appreciated that due to possible angular misalignment about the Y-axis, as the chuck 12 and the optical element 38 change their Z-position, the focal points of different elements of the optical element 38 will coincide with the array 44 at different Z-positions of the chuck 12.

The steps are as follows:

(A) Angular Alignment of the Chuck 12 about the Y-axis.
  (1) The chuck 12 is moved along the Z-axis of the XZ plane in increments, as indicated by the arrow 37.
  (2) At each of the increments in step (1), the chuck is moved or scanned in the Y-axis of the XY plane, as indicated by the arrow 41, and radiation is measured from at least two corresponding off-center detectors 62.
  (3) Based on an analysis of the measurements made in step (2), the chuck 12 is rotated about the Y-axis by a computed angle, as indicated by the arrow 43. The required θY rotation of the chuck 12 has now been completed. The particulars of this operation are is disclosed in further detail hereinbelow, with respect to FIG. 16 and FIG. 17.

(B) Optimum Position of the Chuck 12 in the Z-Axis.
  (4) Step (1) is repeated.
  (5) At each position of the chuck 12 in step (4), the chuck is moved or scanned in the Y-axis of the XY plane, as indicated by the arrow 41, and radiation is measured from the detectors 62. The optimum position of the chuck 12 in the line of movement in the Z-axis of the XZ plane, as indicated by the arrow 37, is determined by analysis of the measurements in this step with respect to FIG. 16 and FIG. 19.

(C) Angular Alignment of the Chuck 12 about the Z-axis.
  (6) The chuck is rotated about the Z-axis of the XZ plane, in angular increments, as indicated by the arrow 39.
  (7) At each of the increments in step (6) the chuck is moved or scanned in the Y-axis of the XY plane, as indicated by the arrow 41, and radiation is measured from at least two corresponding off-center detectors 62.
  (8) Steps (6) to (7) are repeated until required criteria are met in the measurements made in step (7), as is disclosed hereinbelow with respect to FIG. 16 and FIG. 20.

(D) Optimum Position of the Chuck 12 in the Y-Axis.
  (9) Finally, the chuck is again moved or scanned in the XY plane and radiation is measured from at least one detector 62. The optimum position of the chuck 12 in the line of movement in the XY plane, as indicated by the arrow 41, is determined from the measurements in this step.

As indicated above, some aspects of the alignment procedure involve recording or measuring signals produced by the detectors 62 while vertically displacing the chuck 12 together with the optical element 38 in the Y-axis relative to the array 44, as indicated by the arrow 41. This procedure is referred to herein as a "vertical scan", or "vertical scanning operation". Following alignment, as disclosed hereinbelow, the optical element 38 is mounted or adhered to the substrate 40. Similarly, displacements of the chuck 12 and the optical element 38 in the Z-axis are referred to as a "horizontal scan", or "horizontal scanning operation".

The radiation measured is seen on a light intensity plot and in general, the maximum radiation is measured at the optimum position of the chuck 12, when compared with non-optimum positions of the chuck 12. The best focus is reached at the point on the Z-axis where the rate of change of the detected light intensity attains its maximum during a vertical movement of the optical element 38 relative to the array 44, referred to herein as "sensitivity", or "acuteness". Generally, this occurs when the detected light intensity is maximum, and the width of a peak, conveniently measured by its full-width-half maximum, as seen on a plot of the light intensity during the vertical movement, is at a minimum, as will be explained in further detail hereinbelow.

θZ movements of the chuck 12, as indicated by the arrow 39, which create an angle of rotation about the longitudinal axis of the optical element 38 and the longitudinal axis of the array 44, have effects on the off-center receivers, such as the marginal receivers 46, 48. If there exists any vertical deviation about the Z-axis during the alignment between the optical element 38 and the array 44, then the two focal spots of the beams 52, 56 do not have the same intensities, and the radiation received by the marginal receivers 46, 48 is unequal. Furthermore, the intensity plots taken from the marginal receivers 46, 48 during vertical scanning operations have different characteristics, such as shape, phase and FWHM.

θY movements of the chuck 12, as indicated by the arrow 43, change the direction of the beams, for example, the beams 52, 54, 56. If there exists any angular misalignment between the optical element 38 and the array 44 about the Y-axis, then the two focal spots of the beams 52, 56 do not have the same intensity values, and intensity plots taken from the marginal receivers 46, 48 during vertical scanning operations have different characteristics, such as shape, phase and FWHM.

Computer Program and Waveform Display.

Figure 4A:
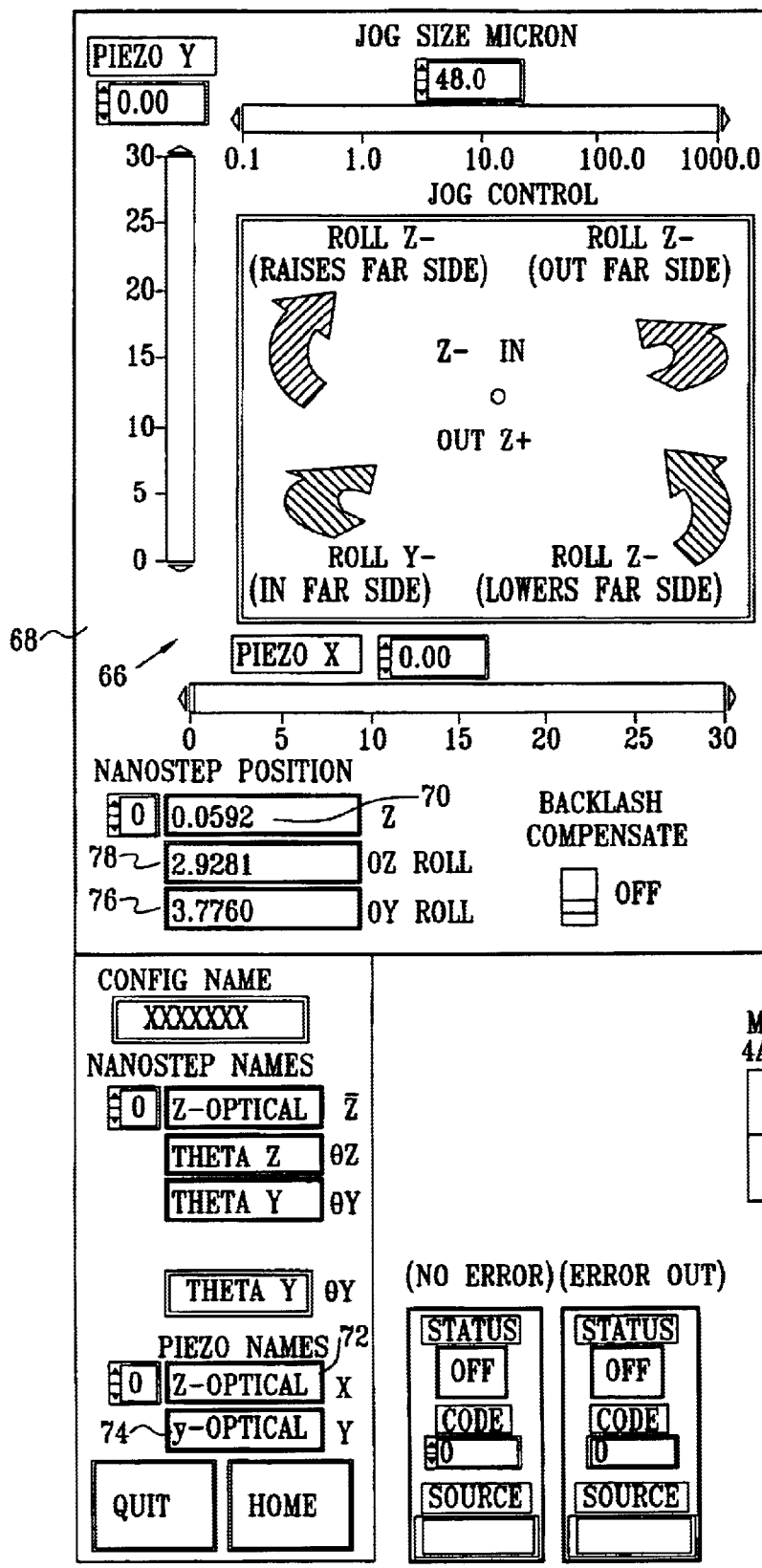
FIGS. 4A–4D are screen displays of a computer program used is controlling the workstation shown in FIG. 1, in accordance with a preferred embodiment of the present invention
Figure 4B:
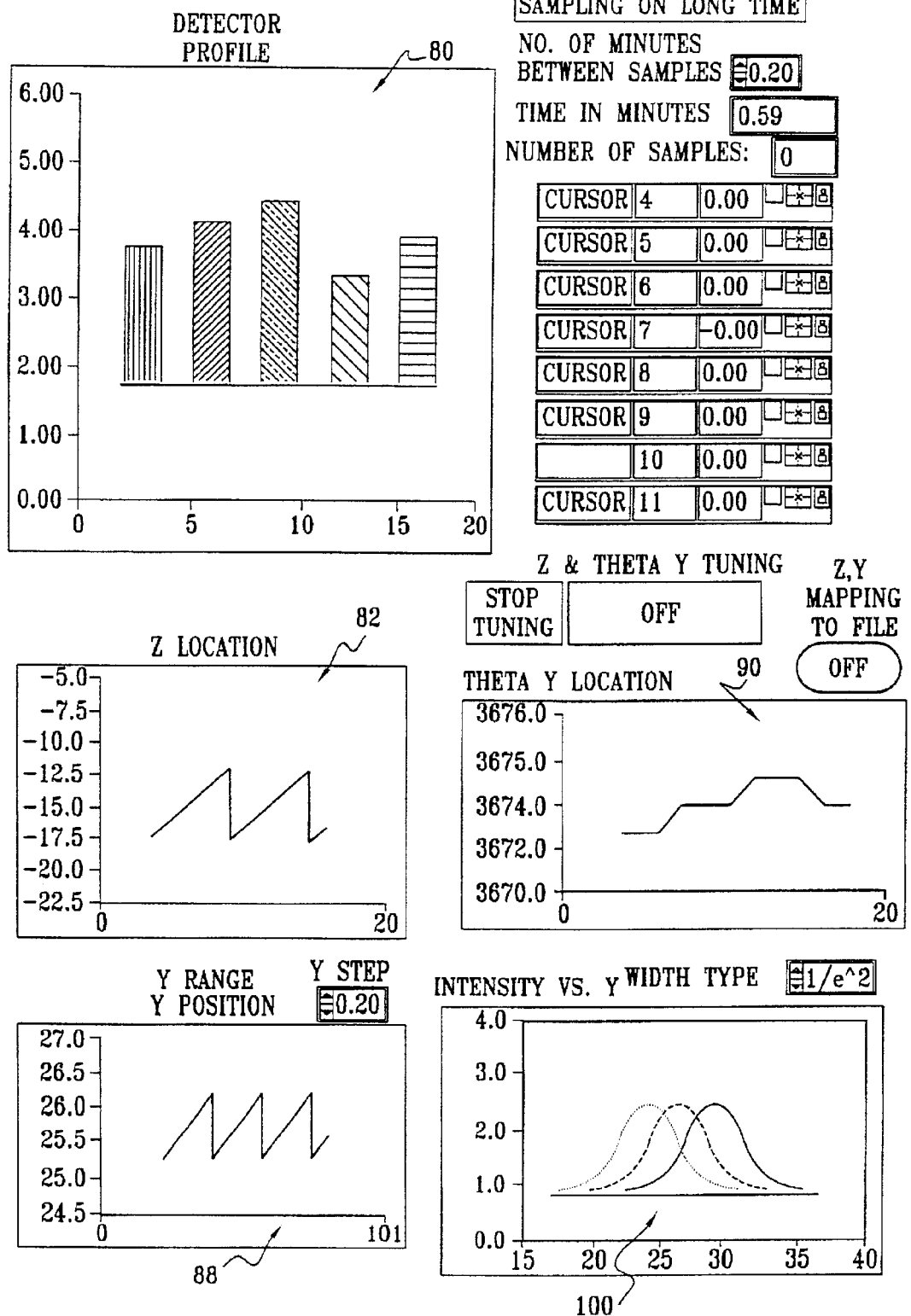
Figure 4C:
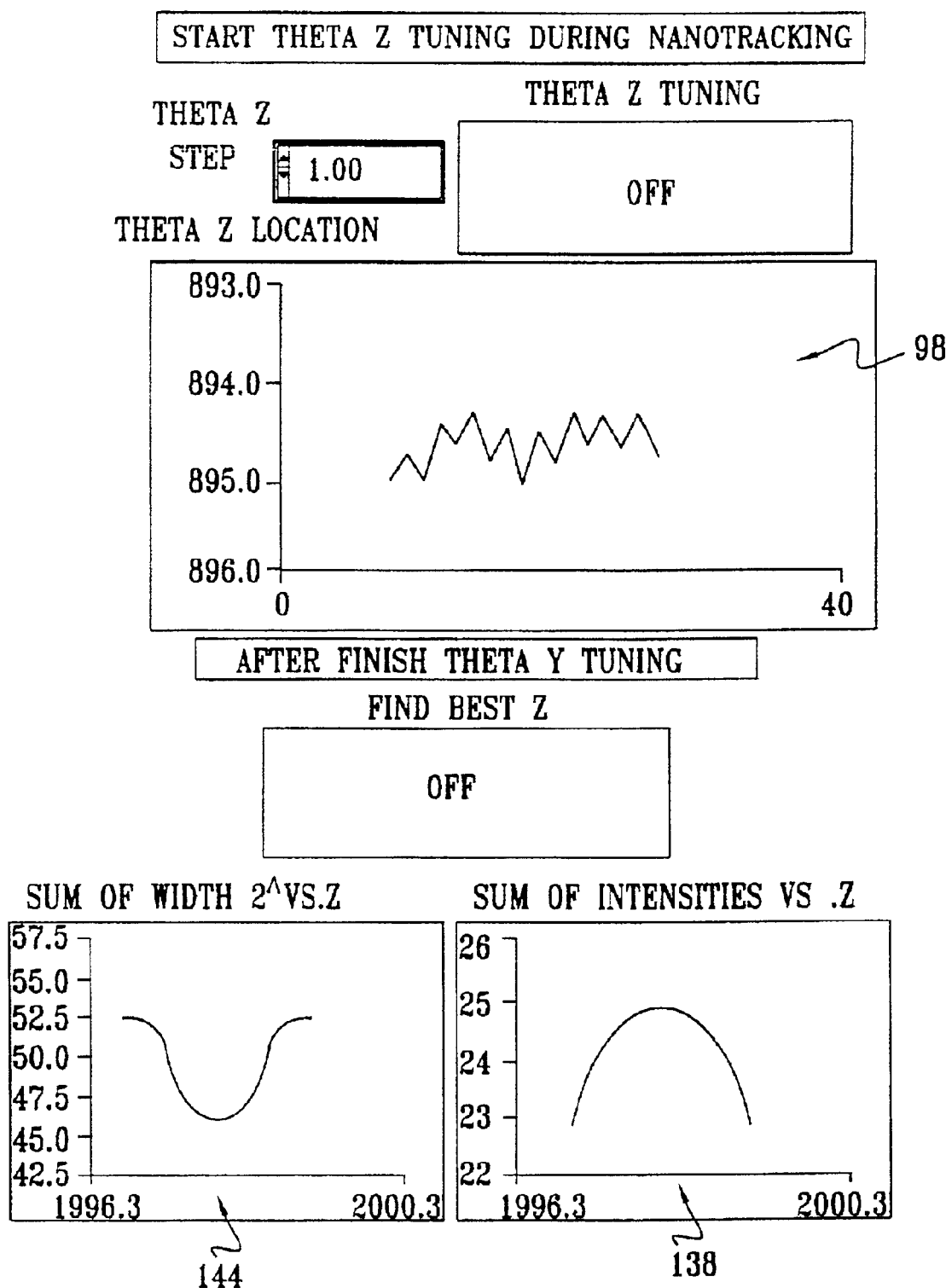
Figure 4D:
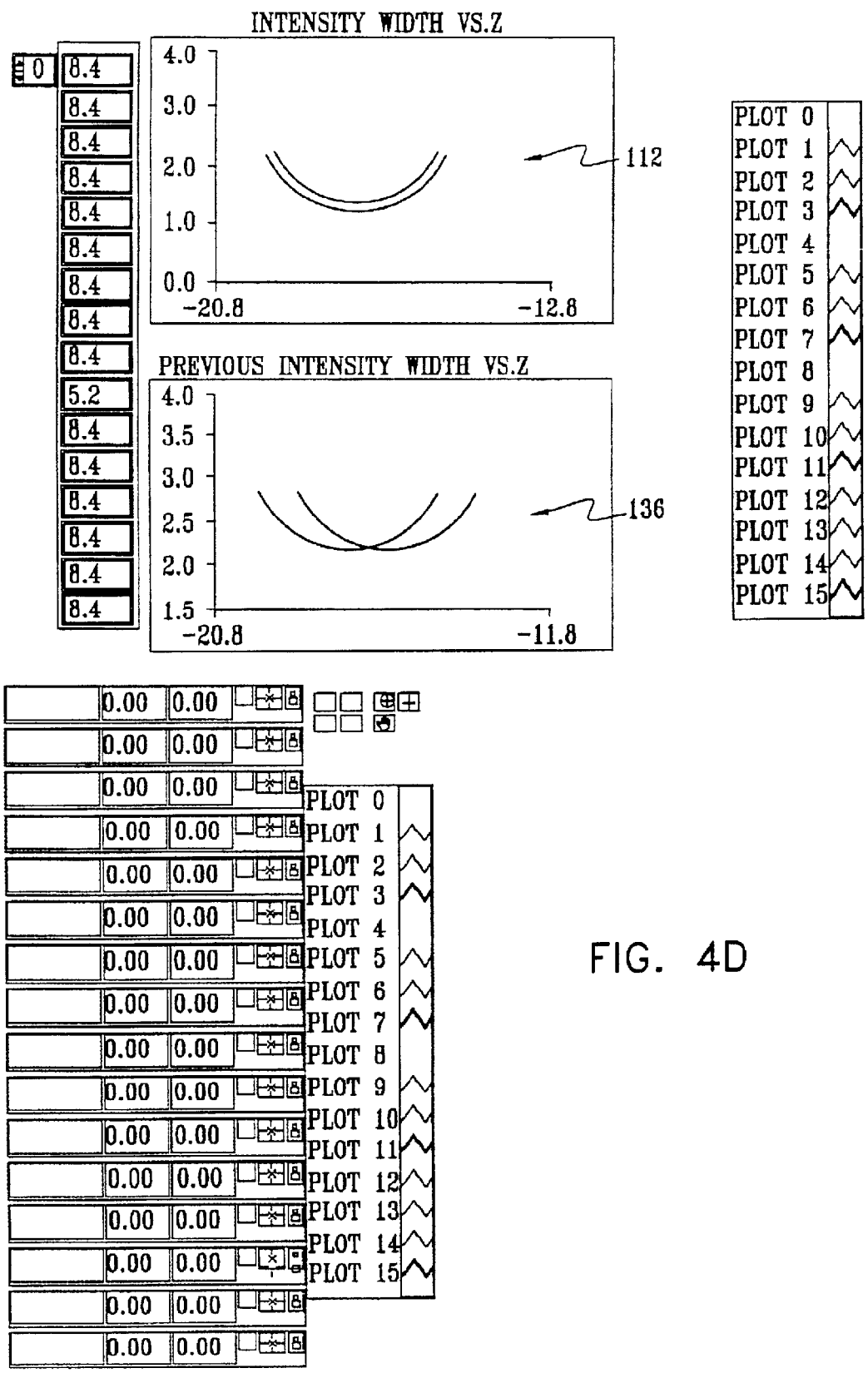

Reference is now made to FIGS. 4A–4D, which illustrate, when combined into a single display, a screen display 66 of a computer program that operates in accordance with a preferred embodiment of the invention. The descriptions of FIGS. 4A–4D are to be read in conjunction with FIG. 1. It is appreciated that the various graphical displays 80, 82, 88, 90, 98, 100, 112, 136, 138 and 144, shown in FIGS. 4B–4D, are shown for illustrative purposes only and each one of these displays is described in more detail hereinbelow. In a preferred embodiment of the invention the computer 7 is controlled by the program associated with the screen display 66. The screen display 66 and the associated program may be created using the programming tool, Labview (TM), available from National Instruments Corporation, 11500 N. Mopac Expwy, Austin, Tex. 78759-3504. By appropriately instructing the computer 7 to vary control signals, the program associated with the screen display 66 can control the movements of the various components of the assembly station 1 to obtain the correct alignment between the optical element 38 and the array 44. Suitable I/O facilities, signal conditioners, and A/D converters (not shown) are controlled by the computer 7 and are linked, via a cable 64, to the motors 17, 19, 21, 23, 25, 27, which energize the various actuators of the assembly station 1.

It will be appreciated that other computer programs may also be written to control the motors 17, 19, 21, 23, 25, 27 according to the teachings of the invention, which can be developed using various computer languages and development tools as are known to those skilled in the art.

Reference is again made to FIGS. 2 and 4A. A front panel 68 is included in the screen display 66. On FIG. 4A is shown a program control 70, which regulates movement of the chuck 12 along the Z-axis. Also shown on FIG. 4A is a program control 72, which regulates movement of the chuck 12 along the X-axis, and a control 74 regulates movement of the chuck 12 along the Y-axis. $\theta Y$ and $\theta Z$ movements of the chuck are regulated by the program controls 76, 78 respectively. Above each of the controls 72, 74, 70, 76, 78 there is an indication of the name and the position of a particular actuator, motor, and piezocontroller of the assembly station 1, the status of which it displays. Various graphic displays are also provided by the screen display 66.

Figure 5:
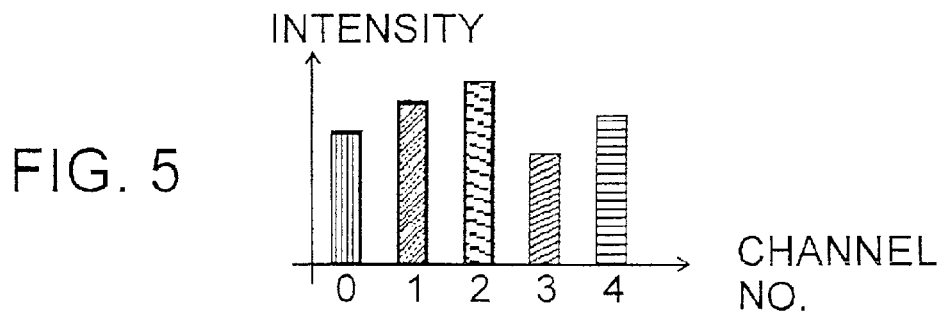
FIG. 5 shows a chart that is displayed on the screen display of FIG. 4B, representing the current signal intensity of the detector output channels, in accordance with a preferred embodiment of the present invention.

Reference is now made to FIG. 5, which illustrates a representative histogram output of the graphic display 80 of the screen display 66. The description of FIG. 5 is to be read in conjunction with FIGS. 2, 3, and 4B. The program associated with the screen display 66 executes iteratively to optimize the alignment of the array 44 with respect to the optical element 38. During its operation the program associated with the screen display 66 provides a real-time information display on a front panel 68. Each of the channels 60 (FIG. 2) corresponds to one of the detectors 62, and is displayed on various real-time graphs, which assist in monitoring an alignment operation. Signal magnitude, representing the current signal intensity on each of the channels 60, is displayed in a unique color on the graphic display 80 (FIG. 4B). Presenting each channel in a unique color allows rapid discrimination by a human observer. For example, when the chuck 12 is moved vertically along its Y-axis, as indicated by the arrow 41 (FIG. 3), evaluation of the histogram enables the operator to observe if the variations in the signal intensities of different channels are synchronized or not, as is explained in further detail hereinbelow, for example with reference to FIG. 20.

Figure 6:
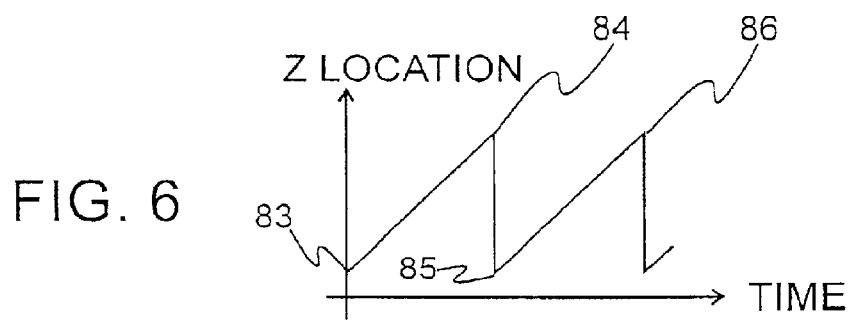
FIG. 6 shows a waveform that is displayed on the screen display of FIG. 4B showing the Z-location of a chuck of the workstation of FIG. 1 as a function of time, in accordance with a preferred embodiment of the present invention.

Reference is now made to FIG. 6, which illustrates a representative output of the graphic display 82 of the screen display 66. The description of FIG. 6 is to be read in conjunction with FIGS. 2, 3, and 4B. During scanning operations along the Y-axis, and along the Z-axis, as respectively indicated by the arrow 41 and the arrow 37 (FIG. 3), the location of the chuck 12 is plotted as a function of the scan time as it moves along the Z axis. This plot is shown on the graphic display 82 (FIG. 4B). The chuck 12 moves from a first starting point 83, performing a horizontal scan along the Z-axis to reach a first end point 84. The chuck 12 then rapidly returns to the starting position, indicated by a point 85, and again executes the horizontal scan, wherein the end of the traversal is represented by a point 86. As the procedure iterates, as outlined hereinabove and described in more detail hereinbelow, for example, in the procedure that is disclosed with reference to FIG. 19, the movement of the chuck 12 in the Z axis, may be represented by the "sawtooth" plot, which is shown in FIG. 6.

The effect of displacing the chuck 12 along the Z-axis of the XZ plane, as indicated by the arrow 37 (FIG. 3), on the intensity plot of a scanning operation can be conveniently assessed by the operator and the automatic identification of an optimum Z-location by the program associated with the screen display 66 visually confirmed, as is disclosed hereinbelow in the section entitled "Operation".

Figure 7:
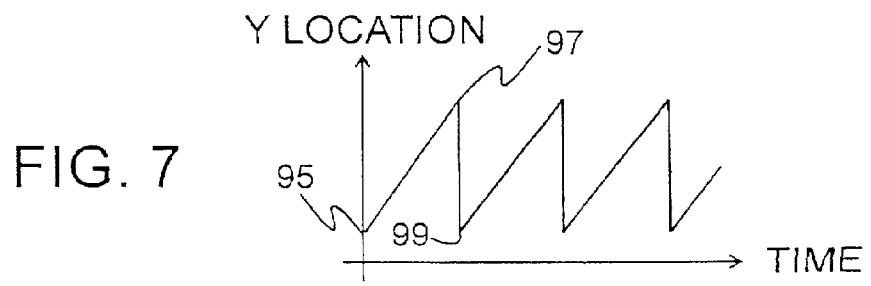
FIG. 7 shows a waveform that is displayed on the screen display of FIG. 4B showing the Y-location of a chuck of the workstation of FIG. 1 as a function of time, in accordance with a preferred embodiment of the present invention.

Reference is now made to FIG. 7, which illustrates a representative output of the graphic display 88 of the screen display 66. The description of FIG. 7 is to be read in conjunction with FIGS. 2, 3, and 4B. The location of the chuck 12, on the Y-axis as a function of time, is shown on the graphic display 88 (FIG. 4B). As described hereinabove with respect to FIG. 6, the movement of the chuck 12 along the Y-axis, as indicated by the arrow 41 (FIG. 3), is similarly represented by a "saw-tooth" plot in FIG. 7. Iterative vertical movements of the chuck 12 occur, for example, during the alignment procedure that is disclosed hereinbelow with reference to FIG. 19. A vertical scanning movement commences with the chuck 12 being typically located at a first extreme end of its travel along the Y-axis, shown as a point 95. During a vertical scanning movement the chuck 12 is displaced vertically until it preferably reaches a second extreme end of its current range of travel along the Y-axis, shown as a point 97. The chuck 12 is then rapidly returned to the first extreme end, which is now represented by a point 99. The vertical scanning motion is iterated during an alignment operation, producing the saw-tooth appearance of the plot in FIG. 7. As the procedure iterates, as outlined hereinabove and described in more detail hereinbelow, for example, in the procedure that is disclosed with reference to FIG. 20, the movement of the chuck 12 in the Y axis, may be represented by the "saw-tooth" plot, which is shown in FIG. 7. Similarly to FIG. 6, the graphic display 88 may be used for quality control purposes and retrospective analysis of the operation of the program associated with the screen display 66 by the operator.

Figure 8:
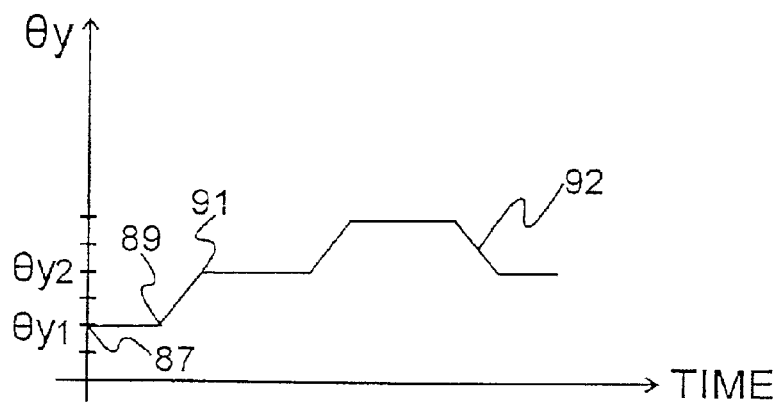
FIG. 8 shows a waveform that is displayed on the screen display of FIG. 4B showing the θY-location of a chuck of the workstation of FIG. 1 as a function of time, in accordance with a preferred embodiment of the present invention.

Reference is now made to FIG. 8, which illustrates a representative presentation of the graphic display 90 of the screen display 66. The description of FIG. 8 is to be read in conjunction with FIGS. 2, 3, and 4B. $\theta Y$ rotation of the chuck 12, as indicated by the arrow 43 (FIG. 3), is displayed on the graphic display 90 (FIG. 4B). While the linear position of the chuck 12 is changed in the Y-axis, as indicated by the arrow 41 (FIG. 3), the angular position of the chuck 12 is held stationary as represented by the horizontal segments of the plot shown in FIG. 8. Thus, between a point 87 and a point 89, the chuck 12 moves vertically in the XY plane, and between a point 89 and a point 91, the chuck 12 is rotated through an angle θY1 to θY2. It is noted that as the scan time progresses the θY motions are executed in discrete steps until the required θY rotation is achieved, as typically represented by the line segment 92. This is explained in further detail hereinbelow with reference to FIG. 17.

In practice the graphic display 88 is an adjunct for quality control purposes and retrospective analysis of the operation of the program associated with the screen display 66.

Figure 9:
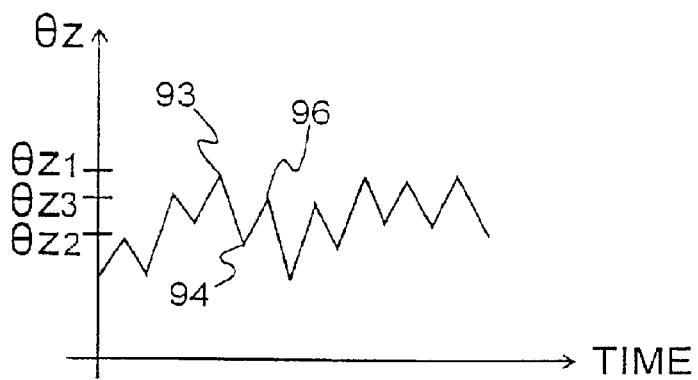
FIG. 9 shows a waveform that is displayed on the screen display of FIG. 4C showing the θZ-location of a chuck of the workstation of FIG. 1 as a function of time, in accordance with a preferred embodiment of the present invention.

Reference is now made to FIG. 9, which illustrates a representative presentation of the graphic display 98 of the screen display 66. The description of FIG. 9 is to be read in conjunction with FIGS. 2, 3, and 4C. Systematic θZ movements of the chuck 12, as indicated by the arrow 39 (FIG. 3), are displayed as a function of time on the graphic display 98 (FIG. 4C). As outlined hereinabove, the θZ rotation is carried out iteratively. At each iteration the chuck 12 remains stationary at a point on the Z-axis while its linear position is changed in the Y-axis, as indicated by the arrow 41 (FIG. 3). At a point 93 a vertical movement of the chuck 12 has just been completed. The chuck 12 is rotated through an angle θZ1 to θZ2 between the point 93 and a point 94. At the point 94 the chuck 12 again is displaced on the Y-axis of the XY plane, and between a point 94 and a point 96, the chuck 12 is again rotated through an angle θZ2 to θZ3. θZ rotation is carried out iteratively until the average θZ angle of the chuck 12 has stabilized sufficiently, as can be seen by the slow convergence of the plot of FIG. 9.

In practice the graphic display 98 is an adjunct for quality control purposes and retrospective analysis of the operation of the program associated with the screen display 66.

Figure 10:
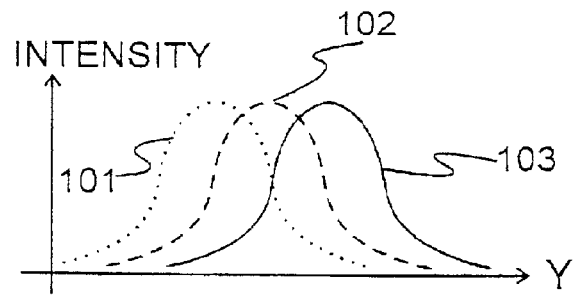
FIG. 10 shows a plurality of waveforms that are displayed on the screen display of FIG. 4B, showing a distribution of radiation intensities at the outputs of the detectors of the workstation shown in FIG. 1, as a function of the position of the chuck along the Y-axis in accordance with a preferred embodiment of the present invention.

Reference is now made to FIG. 10, which illustrates a representative presentation of the graphic display 100 of the screen display 66. The description of FIG. 10 is to be read in conjunction with FIGS. 2, 3, and 4B. The distribution of the signal strengths or radiation intensities as seen in the outputs of the detectors 62 (FIG. 2) is displayed on the graphic display 100 (FIG. 4B) as a function of the location of the chuck 12 on the Y-axis. Each of the plots 101, 102, 103 represents the signal output of a different one of the detectors 62. The position of the central axis of the chuck 12 on the Z-axis is held constant while it is moved vertically in the XY-plane, as indicated by the arrow 41 (FIG. 3).

It is appreciated that due to the possible misalignment of the optical element 38 relative to the array 44, as the chuck 12 moves along the Y-axis, the various emitters of the optical element 38 focus their radiation onto a corresponding element of the array 44 at different Y-positions of the chuck 12. FIG. 10 shows typical plots 101, 102 and 103 for the radiation received by three elements of the array 44, in which the radiation received, is in this particular case, of equal maximum intensity at 3 different Y-positions.

Use of unique colors for the various channels aids the human observer. It is possible for the operator to draw certain inferences from coarse inspection of the plots 101, 102, 103. It will be noted that the width of the unimodal peak of each plot is identical, which indicates that there is no angular misalignment of the chuck 12 about the Y-axis. However, from inspection of a single example of the plots 101, 102, 103, it is not possible to determine whether the location of the chuck 12 on the Z-axis is optimal. It will also be appreciated that the maxima of the plots 101, 102, 103 occur at different points on the Y-axis, indicating that the θZ angle of the chuck 12 is not optimum. Plots, such as the plots 101, 102, 103, may be generated for several values of θZ until their maxima coincide. Further reference may be had to the detailed description of the alignment operation hereinbelow, and to the description of FIG. 19 in particular, in order to facilitate interpretation of the plots 101, 102, 103.

Figure 11:
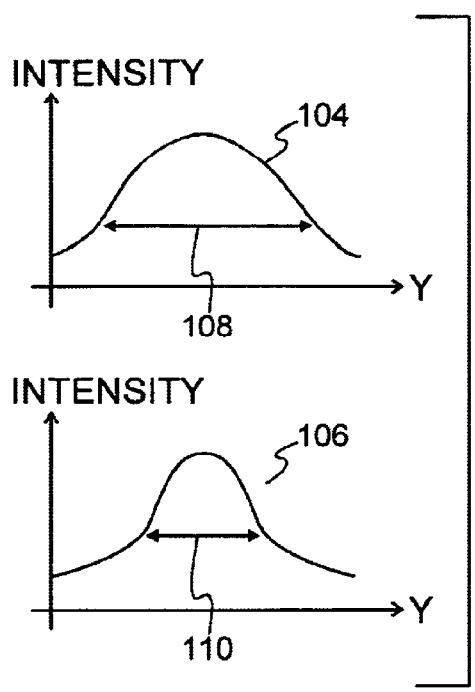
FIG. 11 shows two waveforms each showing a signal intensity plot of a detector channel, for the chuck of the workstation of FIG. 1 at different locations along the Z-axis, in accordance with a preferred embodiment of the present invention.

Reference is now made to FIG. 11, which illustrates a representative plot of one of the channels 60 (FIG. 2). The description of FIG. 11 is to be read in conjunction with FIGS. 2, 4B, and 10. The plots 104, 106, taken from the graphic display 100 (FIG. 4B), represent different iterations of the program associated with the screen display 66. In FIG. 11 the plot 106 represents a vertical scan near the focal point of the system optics along the Z-axis. The plot 104 represents a vertical scan that is remote from the focal point along the Z-axis It will be evident that the full-width half-maximum 108 of the plot 104 is larger than the full-width half-maximum 110 of the plot 106. The inventor has discovered that the analysis of the full-width half-maxima of the plots 104, 106 is particularly useful in optimizing the alignment of the optical element 38 with respect to the array 44. Attainment of a minimum FWHM indicates that an optimum distance between the optical element 38 and a particular receiving element of the array 44 has been determined. The corresponding position of the chuck 12 on the Z-axis is then noted. For additional explanation, reference may be had to the section entitled "Operation".

Figure 12:
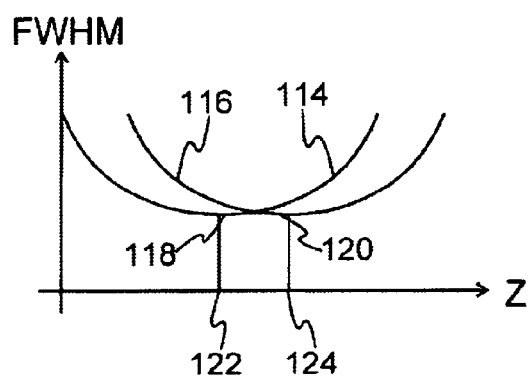
FIG. 12 shows two FWHM waveform plots that are displayed on the screen display of FIG. 4D for two detector channels as a function of the Z-location of the chuck of the workstation of FIG. 1, in accordance with a preferred embodiment of the present invention.

Reference is now made to FIG. 12, which illustrates a representative presentation of the graphic display 112 of the screen display 66. The description of FIG. 12 is to be read in conjunction with FIGS. 2, 3, and 4D. Full-width half-maxima that are derived from individual intensity plots of the detectors 62 at different steps of a horizontal scanning movement of the chuck 12, as indicated by the arrow 37 (FIG. 3), are plotted against the Z-axis on the graphic display 112 (FIG. 4D), at a given value of θY rotation of the chuck 12, as indicated by the arrow 43 (FIG. 3). Although FIG. 12 illustrates FWHM plots taken from only two channels in the interest of clarity, for example the beams 52, 56 (FIG. 2), it is understood that in some embodiments a larger number of channels may be visualized on the graphic display 112. As the chuck 12 is moved along the Z-axis, the radiation intensity of each beam is measured and the FWHM is derived at each measurement, as described hereinbelow. The curves 114, 116 show an example of the variation of the FWHM plots at a given θY rotation The plots 114 and 116 show two minima 118, 120, occurring at different points 122, 124 on the Z-axis, for each of beams 54, 56. The above procedure may be carried out for several values of θY until the results represented by FIG. 13 are achieved.

Figure 13:
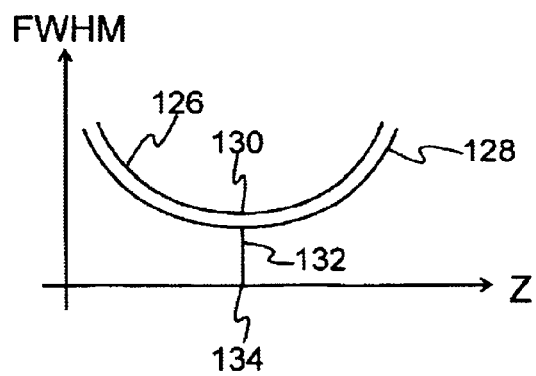
FIG. 13 shows two FWHM waveform plots that are displayed on the screen display of FIG. 4D for two detector channels as a function of the Z-location of the chuck of the workstation of FIG. 1, wherein the chuck has a correct θY alignment, in accordance with a preferred embodiment of the present invention.

Reference is now made to FIG. 13, which illustrates another representative presentation of the graphic display 112 of the screen display 66. The description of FIG. 13 is to be read in conjunction with FIGS. 2, 4D, and 12. The curves 126, 128 are plotted in the same manner as the curves 114, 116 (FIG. 12). The curves 126, 128 have minima 130, 132, which both occur at the point 134 on the Z-axis, indicating that the rotational alignment of the optical element 38 about the Y-axis is correct. A plot of the previous iteration of the program associated with the screen display 66, identical in format with that of the graphic display 112, is shown on the graphic display 136, enabling the operator to compare the progress of the program that has occurred in successive iterations.

Figure 14:
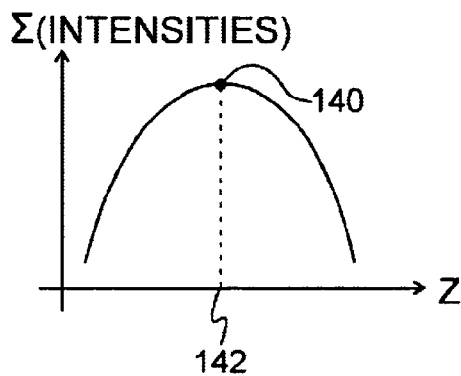
FIG. 14 shows a waveform that is displayed on the screen display of FIG. 4C, illustrating the sum of the intensities of the detector outputs of the workstation of FIG. 1 as a function of the Z-location of the chuck, in accordance with a preferred embodiment of the present invention.

Reference is now made to FIG. 14, which illustrates a representative presentation of the graphic display 138 of the screen display 66. The description of FIG. 14 is to be read in conjunction with FIGS. 2, 3, and 4C. The maximum radiation intensities of the channels 60 are summed at different steps of a horizontal scanning movement of the chuck 12, as indicated by the arrow 37 (FIG. 3), and plotted against the Z-axis. The plot of FIG. 14 is shown on the graphic display 138 (FIG. 4C) at the optimum θY rotation of the chuck 12, as determined from FIG. 13. A maximum value 140 indicates the optimum location 142 of the chuck 12 on the Z-axis.

Figure 15:
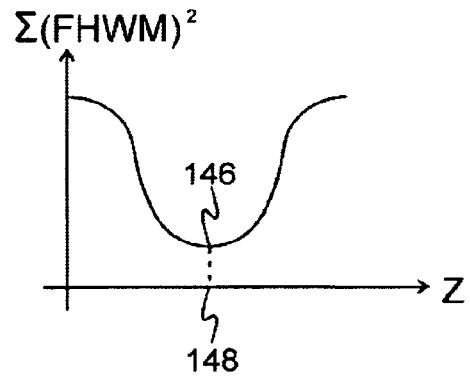
FIG. 15 shows a waveform that is displayed on the screen display of FIG. 4C, illustrating the sum of the squares of the FWHM of the detector outputs of the workstation of FIG. 1 as a function of the Z-location of the chuck, in accordance with a preferred embodiment of the present invention.

Reference is now made to FIG. 15, which illustrates a representative presentation of the graphic display 144 of the screen display 66. The description of FIG. 15 is to be read in conjunction with FIGS. 2, 3, and 4C. The FWHM squared of the channels 60 are summed at different steps of a horizontal scanning movement of the chuck 12, as indicated by the arrow 37 (FIG. 3), and plotted against the Z-axis. The plot of FIG. 15 is shown on the graphic display 144 (FIG. 4C). There is a minimum value 146 at the optimum location 148 of the chuck 12 on the Z-axis.

Operation.

Figure 16:
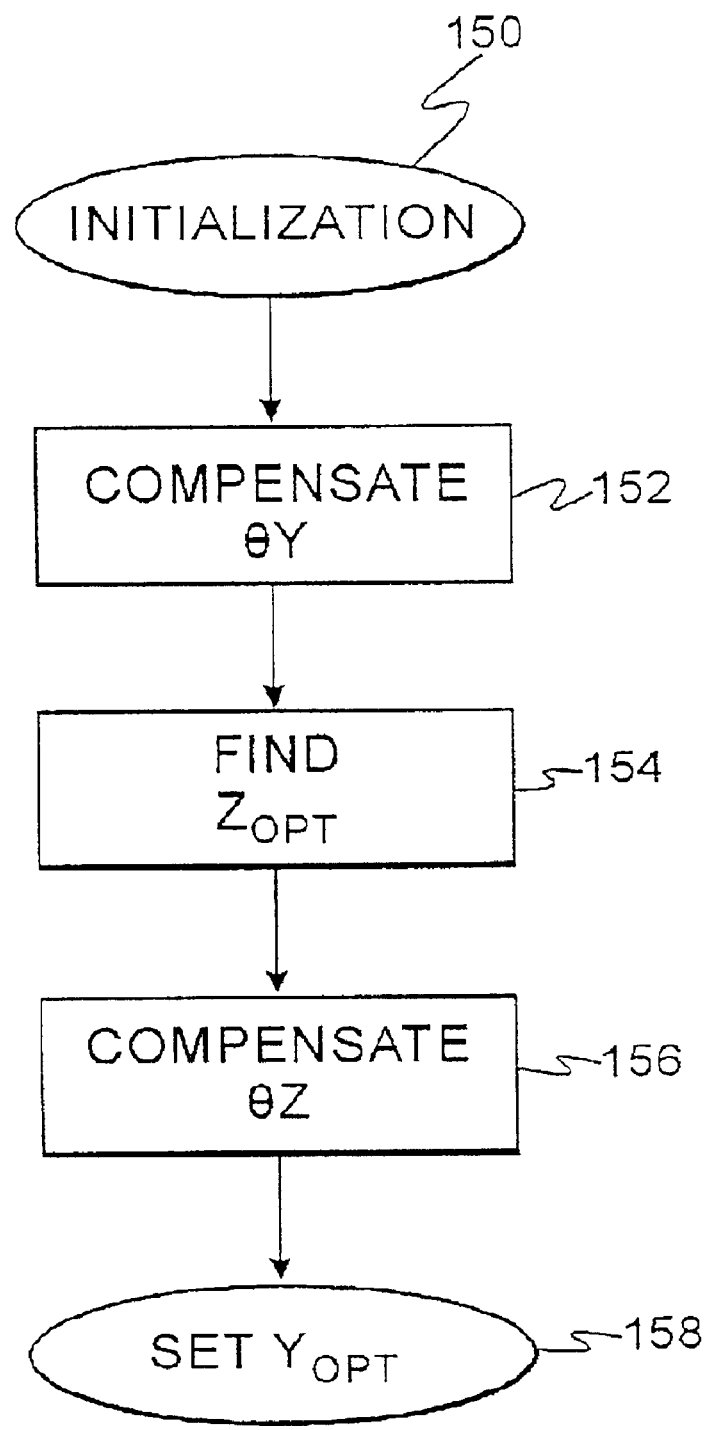
FIG. 16 is a flow diagram illustrating a procedure of alignment in accordance with a preferred embodiment of the present invention.

Reference is now made to FIG. 16, which illustrates a high level flow diagram of a method of alignment in accordance with a preferred embodiment of the invention. The description of FIG. 16 is to be read in conjunction with FIGS. 1, 2, 3, and 4. For convenience, the operation of the program associated with the screen display 66 is disclosed in further detail in conjunction with the detailed description of the method shown in FIG. 16. It is understood that as the method is performed, the program associated with the screen display 66 is executing in the computer 7, causing it to energize and regulate the motors 17, 19, 21, 23, 25, 27 of the assembly station 1 in order to perform the various actions described therein.

Upon completion of an alignment operation, which is disclosed in further detail hereinbelow, the principal optical axis of the optical element 38, represented by the beam 54, coincides with the optical axis of the central receiver 50 within the tolerances given above. The distance between the optical element 38 and array 44 is optimized for focusing the beams 52, 54, 56 onto the array 44. Furthermore, there is no angle of rotation (θZ rotation) about the X-axis of the optical element 38 and the X-axis of the array 44. Thus, a line connecting the marginal receivers 46, 48 would lie in the XZ-plane of the optical element 38. Any needed θX adjustment is performed manually, and is outside the scope of the invention.

In performing the method it is assumed that an array 44 has been placed on a substrate 40, which in turn is carried on the stage 58, and that the optical element 38 has been attached to the chuck 12. At initial step 150, preliminary mechanical adjustment and electrical initialization of the assembly station 1 is performed. Any misalignment about the Y-axis is then compensated at step 152 by scanning along the Z-axis, and executing a vertical scanning operation at each point along the Z-axis, and by adjusting the rotation of the chuck 12 about the Y-axis, as indicated by the arrow 43 (FIG. 3). Next, at step 154 the optimum position of the chuck 12 on the Z-axis, $Z_{OPT}$, is determined. Rotational misalignment about the Z-axis is then compensated at step 156 by adjusting the rotation of the chuck 12 about the Z-axis, as indicated by the arrow 39 (FIG. 3). Finally, the optimum position of the chuck 12 on the Y-axis, $Y_{OPT}$, is determined at step 158.

Step 150 is now explained in further detail. The motor 21 is energized to move the chuck 12 to an initial position, $Z_0$, on the Z-axis. The position of the chuck 12 on the Y-axis is coarsely adjusted until acceptable signal levels are obtained on the detectors 62. An approximately balanced position as to the θY and θZ rotation of the chuck 12 is established by comparing the outputs of the detectors 62 that are associated with the marginal receivers 46, 48, while holding the position of the chuck 12 fixed at the point $Z_0$. The appropriate graphic displays of the screen display 66 are used by the operator during the coarse adjustments of step 150. Initial alignment between the optical element 38 and the array 44 in the X-axis, including θX alignment, is accomplished manually, employing optical aids, such as the video camera 42 and the stereo microscope 6.

Throughout the alignment operation, the motor 21 is utilized to displace the chuck in the Z-axis, and the motors 25, 27 are respectively utilized for θY and θZ movements or rotations. The piezocontrollers (not shown) are used in conjunction with the motors 17, 19 that respectively control displacement of the chuck 12 in the X-axis and the Y-axis, as these motions are required to be especially finely regulated.

Figure 17:
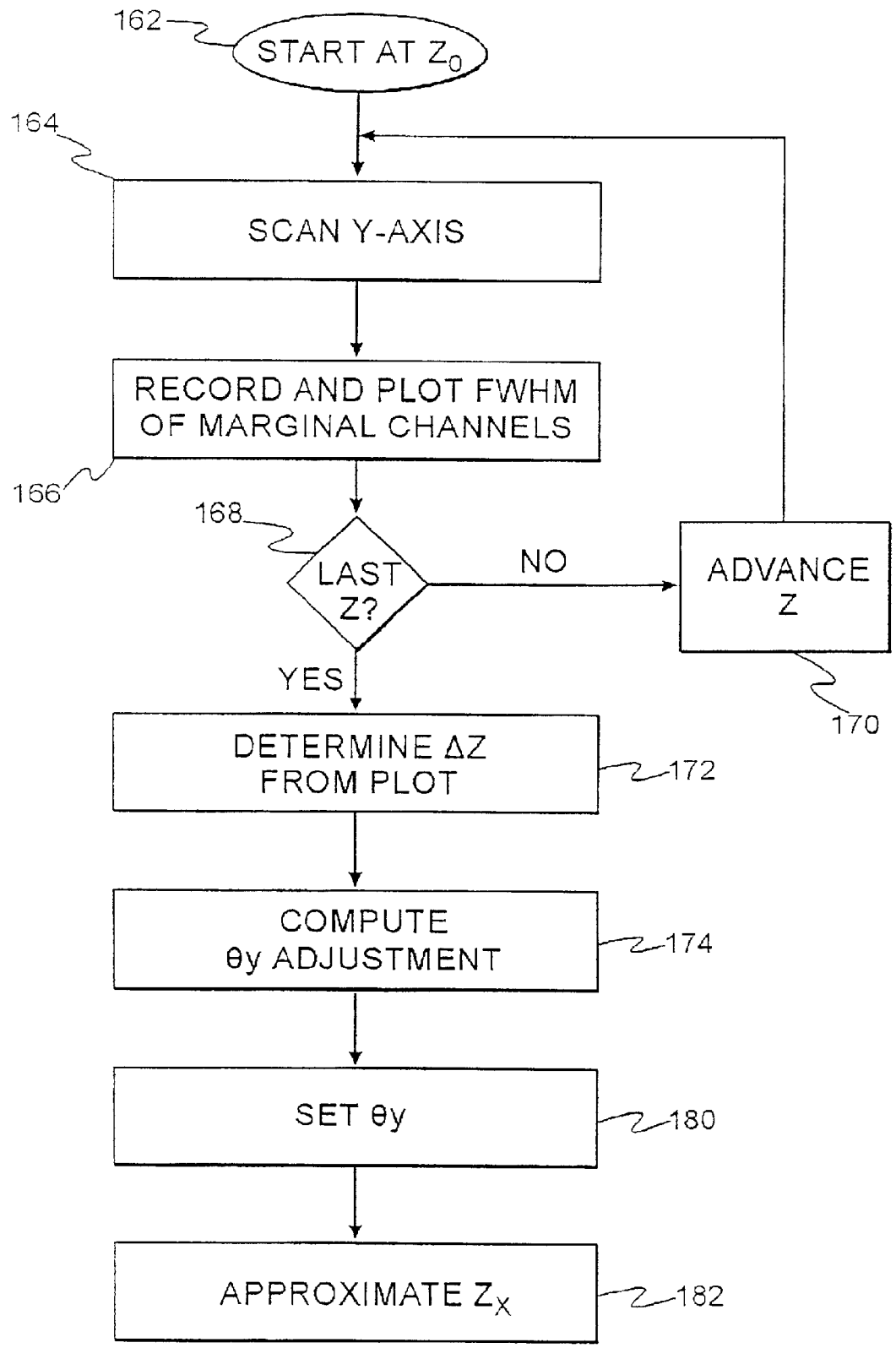
FIG. 17 is a flow diagram of a procedure for adjusting the relative positions of two optical elements in the Z-axis and performing θY movements to obtain a mutually parallel alignment with respect to the Y-axis, in accordance with a preferred embodiment of the present invention.

Reference is now made to FIG. 17, wherein step 152 is disclosed in further detail. Step 152 may be iterative in some applications. The description of FIG. 17 is to be read in conjunction with FIGS. 2, 3, 4, and 16. In embodiments in which step 152 is iterative, the result of each iteration may be observed on the graphic display 100 (FIG. 4B), which displays the FWHM of the current iteration. Cumulative progress may be observed as a FWHM plot (FIG. 12) by viewing the graphic display 112 (FIG. 4C).

The location of the chuck 12 was previously set to the position $Z_0$ in step 150. Execution begins at initial step 162, and proceeds immediately to step 164. At step 164, while recording the response of the marginal receivers 46, 48, a vertical scanning movement of the chuck 12, typically between point 95 to point 97 (FIG. 7), is executed, as indicated by the arrow 41 (FIG. 3), while holding the θY position of the chuck 12 fixed.

At step 166 the FWHM of the response curve of the channels corresponding to each of the marginal receivers 46, 48 is determined, memorized, and plotted against the position of the chuck 12 on the Z-axis, as typically shown in FIG. 12. The signals of the detectors 62 that are associated with the marginal receivers 46, 48 can be viewed during the vertical scanning operation on the graphic display 80 (FIG. 4B), which provides a presentation similar that shown in FIG. 5. Next, at decision step 168 a test is made to determine if movement of the chuck 12 along the Z-axis has reached an extreme position.

If the determination at decision step 168 is negative, then at step 170 the chuck 12 is advanced along the Z-axis, as indicated by the arrow 37 (FIG. 3) and control returns to step 164. In any case the FWHM is determined from the intensity plots corresponding to the marginal receivers 46, 48, which are obtained at each position of the chuck 12 along the Z-axis. Cumulative FWHM plots are generated as the scan progresses along the Z-axis, as shown in the example of FIG. 12.

Choosing the step size along the Z-axis requires a tradeoff between processing speed and accuracy. This value can be chosen by the user to suit a particular application. In current applications, it has been advantageous to employ an initially large step, typically 10–20 $\mu$m. Then, after an optimum Z-value has been tentatively determined, the step size is decreased in subsequent iterations, typically down to 0.5–1 $\mu$m. When this is done the excursion along the Z-axis is localized to the region of the tentatively determined optimum Z-value in order to improve processing speed.

If, at decision step 168, it is determined that the traversal of the chuck 12 along the Z-axis is complete, then the positions of the minima of the cumulative FWHM plots of the marginal receivers 46, 48, and the difference therebetween for each step are determined at step 172. The cumulative FWHM plots have the general unimodal form shown in FIG. 12. In general, the two minima 118, 120 do not coincide at the completion of step 172. The result obtained in step 172 is a value, ΔZ, given by $$\Delta Z = Z_2 - Z_1 \quad (1)$$

where $Z_2$ and $Z_1$ are the Z-values at the minima of the cumulative FWHM plots of the marginal receivers 46, 48. In the example of chuck 12, ΔZ would correspond to the interval between the point 122 and the point 124.

Figure 18:
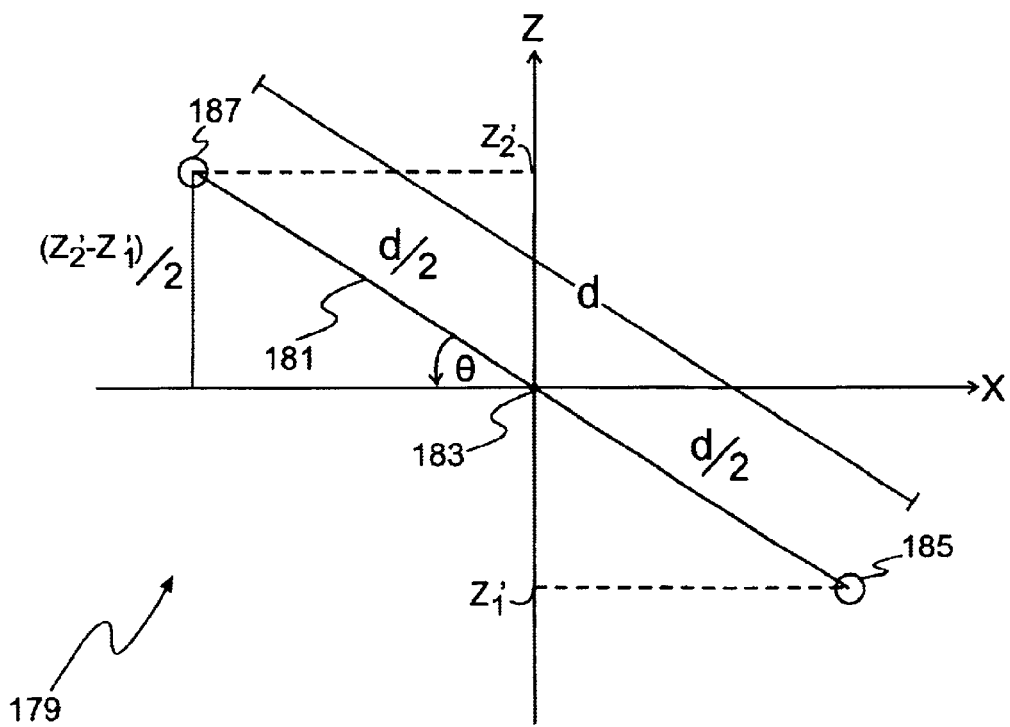
FIG. 18 is a geometric illustration that is helpful in understanding a calculation performed in the procedure illustrated in FIG. 17, in accordance with a preferred embodiment of the present invention.

Reference is now made to FIG. 18, which shows a geometric FIG. 179 drawn in the XZ plane. The description of FIG. 18 is helpful in understanding step 174, and is to be read in conjunction with FIG. 2 and FIG. 17. The Z-values $Z_1$ and $Z_2$ that were determined in step 172 are indicated on the Z-axis as the points $Z_1'$ and $Z_2'$, which are transposed as necessary, such that the XY-plane lies midway therebetween. A line 181 having its midpoint 183 on the Z-axis has a length d, which is equal to the distance between the marginal receivers 46, 48. The X-axis passes through the midpoint 183 of the line 181. The end points 185, 187 of the line 181 have Z-coordinates of $Z_1'$ and $Z_2'$ respectively, and the line 181 forms an angle θ with the X-axis. The value of the angle θ can readily be determined trigonometrically, and is given by $$\theta = \sin^{-1}[([Z_2'-Z_1']/2)/(d/2)] = \sin^{-1}([Z_2'-Z_1']/d) \quad (2)$$

In some embodiments, if the angle θ is small, the arcsine term of equation (2) is approximated by a constant that is multiplied by the value $[Z_2'-Z_1']$.

Referring again to FIG. 17, at step 174 an angle of rotation about the Y-axis is computed according to equation (2).

Following the completion of step 174 control passes to step 180. The motor 25 is energized to execute the θY motion, rotating the chuck 12 in the appropriate direction by the angle that was computed in step 174, as indicated by the arrow 43 (FIG. 3), so that the optical element 38 and the array 44 are aligned essentially parallel to one another in the XZ plane.

In step 182 an approximate value of the optimum position of the optical element 38 in the Z-axis, $Z_X$, is obtained from the plot that was constructed in step 166. This value is found at the intersection of the response curves of the marginal receivers 46, 48, and can be appreciated visually on the graphic display 112 (FIG. 4C). In the example of FIG. 12, the value $Z_X$ is the Z-coordinate of the point 115.

In some embodiments control returns to step 164. The procedure may iterate a predetermined number of times, using a smaller step size in the movements of the chuck 12 in step 170 as was described hereinabove.

Figure 19:
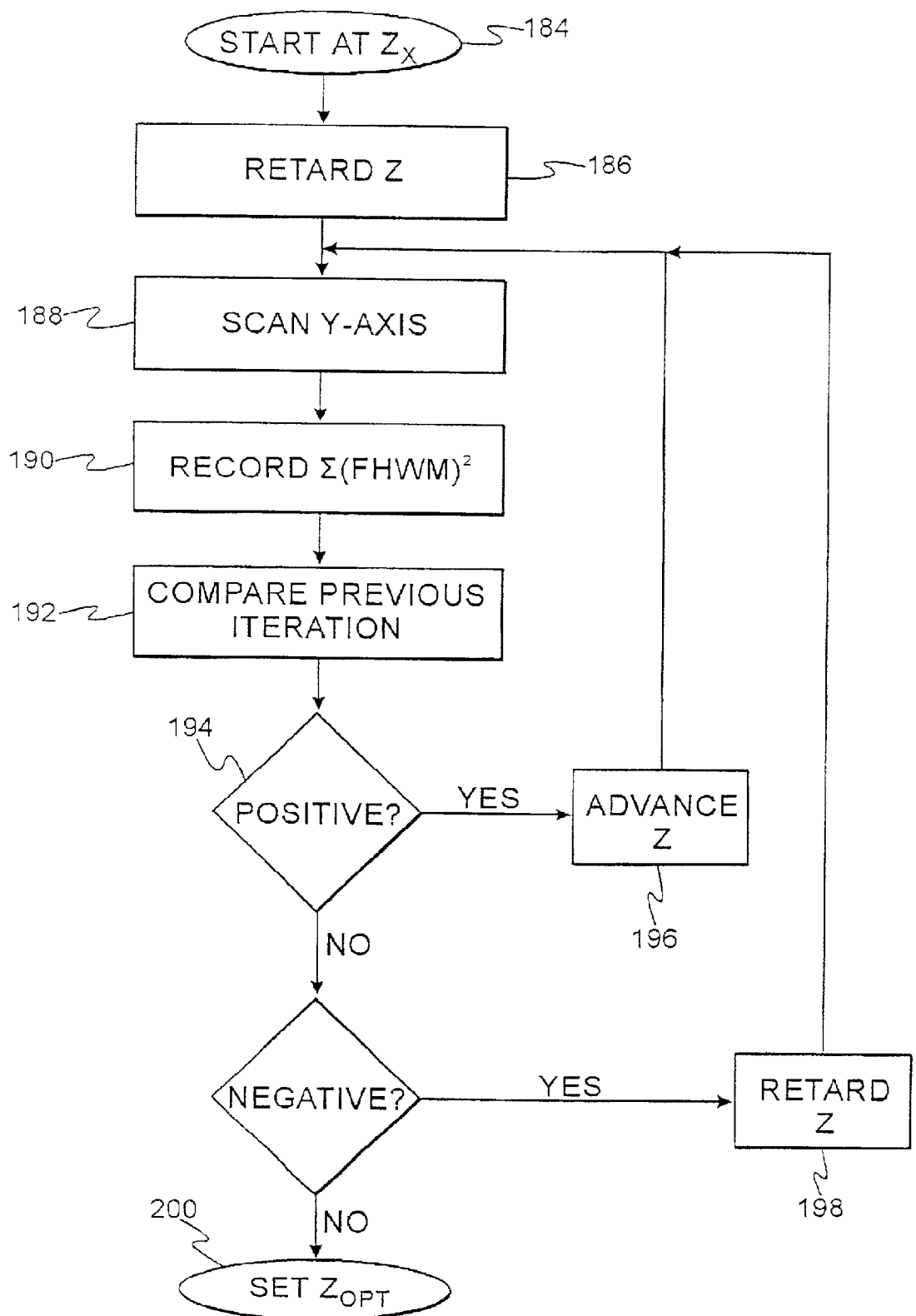
FIG. 19 is a flow diagram of a procedure for determining the displacement between two optical elements on an optical axis, in accordance with a preferred embodiment of the present invention.

Reference is now made to FIG. 19, wherein a flowchart illustrates step 154 (FIG. 16) in further detail. The description of FIG. 19 is to be read in conjunction with FIGS. 2, 4, 16, and 18. Step 154 is iterative.

The procedure begins at initial step 184 following completion of step 182, wherein the chuck 12 is positioned at the position $Z_X$ that was determined in step 182. Then, at step 186, the position of the chuck 12 is retarded a short distance along the Z-axis, as indicated by the arrow 37 (FIG. 3), in order to move its starting point slightly behind the approximate optimum location, $Z_X$. Preferably the starting point is moved to a point approximately 100 μm behind the approximate optimum location. At step 188 a vertical scanning movement of the chuck 12 is performed, as indicated by the arrow 41 (FIG. 3) and the response of at least one of the detectors 62 is tracked. The signals output by detectors 62 can be viewed during the vertical scanning operation on the graphic display 80 (FIG. 4B), which provides a presentation similar that shown in FIG. 5. At step 190 the sum of the FWHM squared of the response curves of the detectors 62 being tracked is computed. A cumulative plot of the sum of the FWHM squared against the position of the chuck 12 on the Z-axis may be viewed by the operator on the graphic display 144 (FIG. 4C; FIG. 15). In order to seek a minimum value of the sum of the FWHM squared of the response curves of the channels 60, the sum that is computed in the current iteration is subtracted in step 192 from the corresponding sum that was computed in the previous iteration. The latter is initialized to an arbitrary value prior to the first iteration in order to provide a basis of comparison at the first iteration.

The result obtained in step 192 is tested in decision step 194. If the result of the subtraction is a positive number that exceeds a first predetermined value, then the location of the chuck 12 is behind its optimum position in the Z-axis, and needs to be advanced. This is done in step 196, after which control returns to step 188.

If the result obtained in step 192 is a negative number that is more negative than a second predetermined value, then the location of the chuck 12 is ahead of its optimum position in the Z-axis, and needs to be retarded. This is done in step 198, after which control returns to step 188.

In some embodiments the step size on Z may be varied adaptively in step 196 and step 198. Preferred values for the step size are the same as were disclosed in the discussion of step 170 (FIG. 17).

If the result obtained in step 192 is within the interval defined by the first predetermined value and the second predetermined value, then the location on the Z-axis is considered to be optimum, and the procedure terminates at step 200. The optimum point, $Z_{OPT}$, coincides with a minimum value of the sum of the FWHM squared of the response curves of the channels 60.

Figure 20:
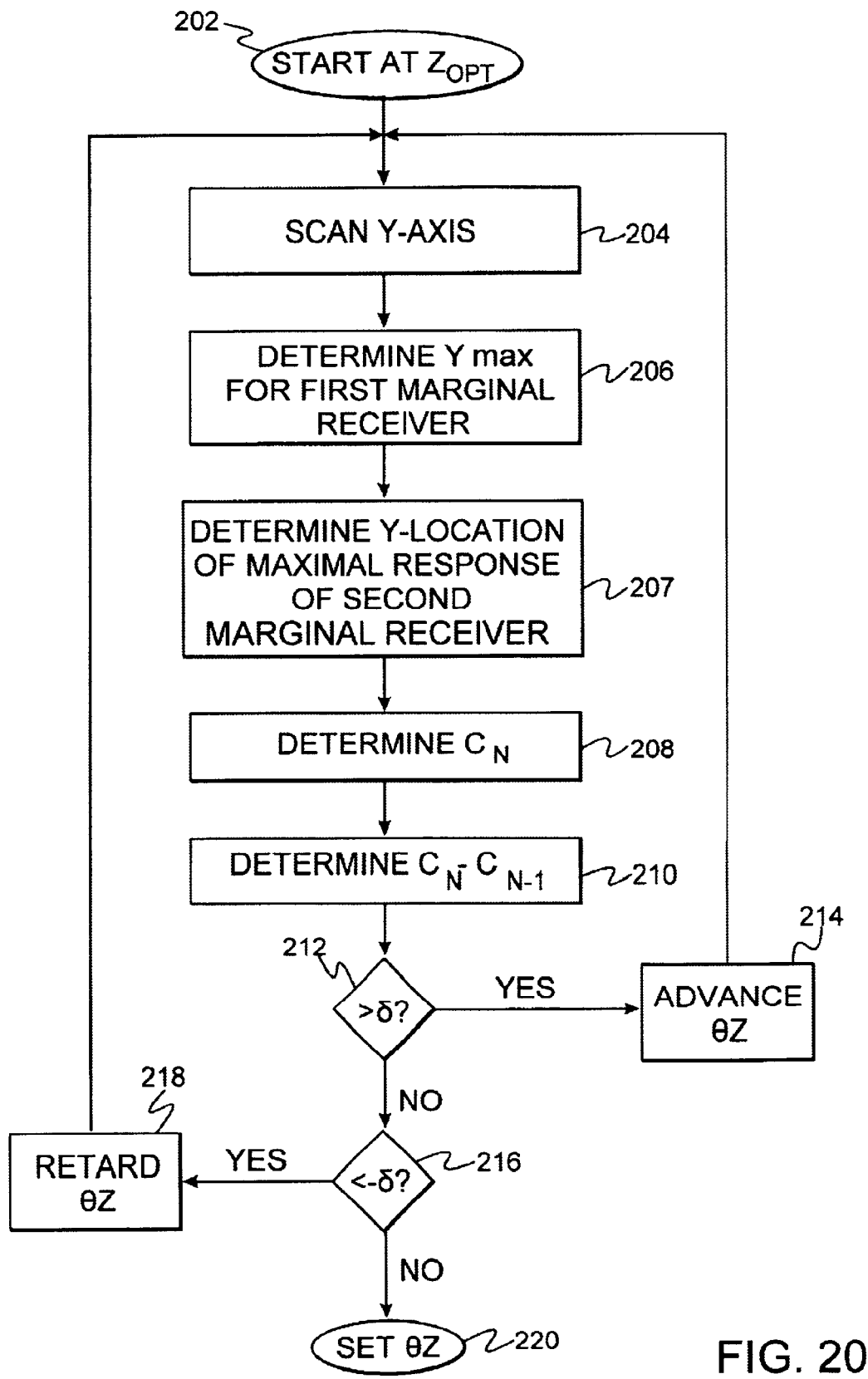
FIG. 20 is a flow diagram of a procedure for rotationally aligning two optical elements about an optical axis, in accordance with a preferred embodiment of the present invention.

Reference is now made to FIG. 20, wherein a flow chart explains step 156 in further detail. The description of FIG. 20 is to be read in conjunction with FIGS. 2, 3, 4, 16, and 19. The approach is to iteratively adjust the angle θZ using the nanotracking facility of the screen display 66, while holding the vertical position of the chuck 12 at the point on the Y-axis at which the light falling on one of the marginal receivers 46, 48, has maximum intensity, and observing the response of the other one of the marginal receivers 46, 48 to the adjustment.

In initial step 202, the location of the chuck 12 is set at the point $Z_{OPT}$, which was previously established in step 200 (FIG. 19). A current roll position about the Z-axis (θZ rotation) is observable on the indicator of the program control 78 of the screen display 66. Then at step 204, while recording the response of the detectors 62 corresponding to the marginal receivers 46, 48, a scanning movement of the chuck 12 is made along the Y-axis, as indicated by the arrow 41 (FIG. 3), holding the θY fixed in the position that was set in step 180 (FIG. 17). The response of the marginal receivers 46, 48 is tracked, and a point $Y_{MAX}$, measured as the Y-coordinate of the central axis of the chuck 12, corresponding to the maximum signal intensity detected by the marginal receiver 46, is identified at step 206. At step 207 the Y-location of the maximum signal intensity detected by the second marginal receiver 48 is noted. At step 208 the Y-value that was determined in step 207 for the marginal receiver 48 is subtracted from the point $Y_{MAX}$ of the marginal receiver 46 that was determined in step 206, to yield a value $C_N$. At step 210, the value $C_N$ is compared to a corresponding value $C_{N-1}$ that was determined in the previous θZ iteration. A value $C_0$ is initialized to an arbitrary value in order to provide a basis of comparison at the first iteration. Of course, the roles of the marginal receivers 46, 48 may be reversed, if desired. The operator may also observe the response of the marginal receivers 46, 48 on the graphic display 100 (FIG. 4B). It may be noted that as a result of compensatory rotation of the chuck 12 about the Z-axis in each iteration (steps 214, 218), it is necessary that the point $Y_{MAX}$ be redetermined in the following iteration, as the marginal receivers 46, 48 are located at a distance from the central axis of the chuck 12.

If, at decision step 212, the difference between the values $C_N$ and $C_{N-1}$ in the two iterations exceeds a predetermined value δ, then at step 214 the motor 27 is energized to advance the angle θZ of the chuck 12, as indicated by the arrow 39 (FIG. 3), and control returns to step 204.

Otherwise, control proceeds to decision step 216. If at decision step 216, the difference between the values $C_N$ and $C_{N-1}$ in the two iterations is less than a predetermined value −δ, then at step 218 the angle θZ of the chuck 12 is retarded, and control returns to step 204.

In step 214 and step 218 the step size of the θZ movement is application dependent. Values of 2–10 milliradians are preferred.

If, at decision step 216, the difference between the values $C_N$ and $C_{N-1}$ in the two iterations is not less than the predetermined value −δ, it is considered that the value of the angle θZ of the chuck 12 is optimized, and the procedure ends at step 220.

Referring again to FIG. 16, step 158 is now disclosed in further detail. Step 158 is performed by repeating a vertical scanning motion of the chuck 12, while maintaining the previously determined optimum positions of the chuck 12 on the Z-axis, the X-axis, and the previously determined optimum angular rotation about the Y-axis and the Z-axis. During this vertical scan the response of any one of the channels 60 is measured. The procedure is completed by identifying the position $Y_{OPT}$ of the chuck 12 on the Y-axis that corresponds to the maximum signal intensity of the channel being tracked. Alignment of the optical element 38 with respect to the array 44 is now complete.

Referring once again to FIG. 2, while maintaining the position of the chuck 12, the optical element 38 is glued in place on the substrate 40. The vacuum holding the optical element 38 to the chuck 12 is slowly released in order to separate the chuck 12 from the optical element 38. The substrate 40 and its components may then be removed from the assembly station 1.

The screen display 66 provides a number of graphic displays that need not be viewed during the alignment according to the preferred embodiment of the invention. The graphic display 82 (FIG. 4A), the graphic display 88 (FIG. 4D), the graphic display 90 (FIG. 4B), and the graphic display 98 (FIG. 4C) have been found to be useful analytic tools. They have been helpful during refinement of the techniques disclosed herein, and in the evaluation of malfunction of the instrumentation.

While this invention has been explained with reference to the structure disclosed herein, it is not confined to the details set forth, and this application is intended to cover any modifications and changes as may come within the scope of the following claims:

What is claimed is:

1. A method of alignment, comprising the steps of:
    holding a first optical element in opposition to a second optical element for interalignment therewith, said second optical element including a plurality of receivers including a first marginal receiver and a second marginal receiver, said first optical element having a first axis and a second axis, and said second optical element having a third axis and a fourth axis;
    detecting a plurality of light signals that pass from said first optical element to said second optical element, said light signals including a first light signal that impinges on said first marginal receiver, and a second light signal that impinges on said second marginal receiver;
    in a first phase of operation rotating said first optical element about a Y-axis until said second axis is in a parallel alignment with said fourth axis; and
    in a second phase of operation displacing said first optical element along said Y-axis;
    while displacing said first optical element along said Y-axis, recording a signal strength of said first light signal and said second light signal; and
    displacing said first optical element along a Z-axis until said signal strength has an optimal value, further comprising the steps of:
        in said first phase of operation displacing said first optical element stepwise on an interval of said Z-axis, defining a plurality of incremental positions thereon;
        at each of said incremental positions displacing said first optical element on an interval of said Y-axis;
        while said step of displacing said first optical element on said interval of said Y-axis is being performed, determining a function of said first light signal and determining a function of said second light signal;
        after said step of displacing said first optical element stepwise on said interval of said Z-axis has been performed, determining a first point on said Z-axis where said function of said first light signal has a first optimum value and a second point on said Z-axis where said function of said second light signal has a second optimum value;
        calculating a difference ΔZ between said second point and said first point;
        responsive to said step of calculating rotating said first optical element about said Y-axis to reduce a distance between said first marginal receiver and said second point.

2. The method according to claim 1, wherein said step of rotating said first optical element about said Y-axis comprises rotation by an angle θ that is given by $$\theta = \sin^{-1}(\Delta Z/d)$$

where d is a displacement between said first marginal receiver and said second marginal receiver.

3. The method according to claim 1, wherein said function is a full-width half maximum, said first optimum value and said second optimum value are each a minimum value of said function.

4. A method of alignment, comprising the steps of:
    holding a first optical element in opposition to a second optical element for interalignment therewith, said second optical element including a plurality of receivers including a first marginal receiver and a second marginal receiver, said first optical element having a first axis and a second axis, and said second optical element having a third axis and a fourth axis;

detecting a plurality of light signals that pass from said first optical element to said second optical element, said light signals including a first light signal that impinges on said first marginal receiver, and a second light signal that impinges on said second marginal receiver;

in a first phase of operation rotating said first optical element about a Y-axis until said second axis is in a parallel alignment with said fourth axis; and in a second phase of operation displacing said first optical element along said Y-axis;

while displacing said first optical element along said Y-axis, recording a signal strength of said first light signal and said second light signal; and displacing said first optical element along a Z-axis until said signal strength has an optimal value, further comprising the steps of:

in a first iteration: displacing said first optical element on an interval of said Y-axis;

while said step of displacing said first optical element is being performed in said first iteration, determining a first point on said Y-axis wherein said first signal has a first maximum magnitude, and a second point on said Y-axis where said second signal has a second maximum magnitude;

rotating said first optical element about said Z-axis by a first increment;

in a second iteration: displacing said first optical element on said interval of said Y-axis;

while said step of displacing said first optical element is being performed in said first iteration, determining a third point on said Y-axis wherein said first signal has a third maximum magnitude, and a fourth point on said Y-axis where said second signal has a fourth maximum magnitude;

responsive to a difference between said third magnitude and said fourth magnitude, rotating said first optical element about said Z-axis by a second increment.

\* \* \* \* \*